(12) United States Patent
Kamin-Lyndgaard et al.

(10) Patent No.: US 9,122,456 B2
(45) Date of Patent: Sep. 1, 2015

(54) ENHANCED DETACHABLE SENSORY-INTERFACE DEVICE FOR A WIRELESS PERSONAL COMMUNICATION DEVICE AND METHOD

(71) Applicants: Canopy Co., Inc., Minneapolis, MN (US); Paul J. Sadler, Rochester, MN (US)

(72) Inventors: Andrew C. Kamin-Lyndgaard, Minneapolis, MN (US); Paul J. Sadler, Rochester, MN (US)

(*) Notice: Subject to any disclaimer, the term of this patent is extended or adjusted under 35 U.S.C. 154(b) by 0 days.

(21) Appl. No.: 14/396,050

(22) PCT Filed: Apr. 23, 2013

(86) PCT No.: PCT/US2013/037867
§ 371 (c)(1),
(2) Date: Oct. 21, 2014

(87) PCT Pub. No.: WO2013/163233
PCT Pub. Date: Oct. 31, 2013

(65) Prior Publication Data
US 2015/0103018 A1 Apr. 16, 2015

Related U.S. Application Data

(63) Continuation-in-part of application No. 13/844,067, filed on Mar. 15, 2013.

(60) Provisional application No. 61/814,336, filed on Apr. 21, 2013, provisional application No. 61/687,293, filed on Apr. 23, 2012.

(51) Int. Cl.
*G06F 3/0488* (2013.01)
*G06F 1/16* (2006.01)
*G09G 5/00* (2006.01)
*G06F 3/044* (2006.01)
*G06F 3/01* (2006.01)
*G06F 3/041* (2006.01)
*G06F 21/31* (2013.01)

(52) U.S. Cl.
CPC .............. *G06F 1/169* (2013.01); *G06F 1/1626* (2013.01); *G06F 1/1632* (2013.01); *G06F 3/016* (2013.01); *G06F 3/017* (2013.01); *G06F 3/044* (2013.01); *G06F 3/0416* (2013.01); *G06F 3/04883* (2013.01); *G06F 21/31* (2013.01); *G09G 5/006* (2013.01); *G06F 2203/04809* (2013.01); *H04M 2250/22* (2013.01)

(58) Field of Classification Search
CPC ......... G06F 3/048; G06F 3/044; G06F 3/045; G06F 3/0412; G06F 3/0416
USPC ............ 345/156, 173–175; 178/18.01–18.07, 178/19.01–19.05
See application file for complete search history.

(56) References Cited

U.S. PATENT DOCUMENTS

| 5,543,588 A | 8/1996 | Bisset et al. |
| 8,385,885 B2 | 2/2013 | Hainzl |
| 8,665,236 B2 | 3/2014 | Myers |

(Continued)

*Primary Examiner* — Ricardo L Osorio
(74) *Attorney, Agent, or Firm* — Charles A. Lemaire; Jonathan M. Rixen; Lemaire Patent Law Firm, P.L.L.C.

(57) ABSTRACT

A system and method that utilizes a protective sensor-interface apparatus, which removably connects and interfaces to a mobile electronic device, enabling users to more readily access and engage mobile content and data. The present invention provides a method and device wherein the user interfaces with digital content by using touch-sensitive areas on the back and sides of a protective case that interfaces with the mobile device, the software application and other users. This enables additional features that can be customized by users and developers for enhanced sensory experiences and digital rights management by creating components of a separate environment that exists in the case.

25 Claims, 20 Drawing Sheets

(56) References Cited

U.S. PATENT DOCUMENTS

| | | |
|---|---|---|
| 2003/0191721 A1 | 10/2003 | Fiammante |
| 2004/0263483 A1 | 12/2004 | Aufderheide |
| 2007/0103454 A1 | 5/2007 | Elias |
| 2010/0088439 A1 | 4/2010 | Ang et al. |
| 2011/0021251 A1 | 1/2011 | Linden |
| 2011/0148915 A1 | 6/2011 | Kim |
| 2012/0007822 A1 | 1/2012 | Luo |
| 2012/0052929 A1 | 3/2012 | Thammasouk et al. |

FIG. 15A
FIG. 15C
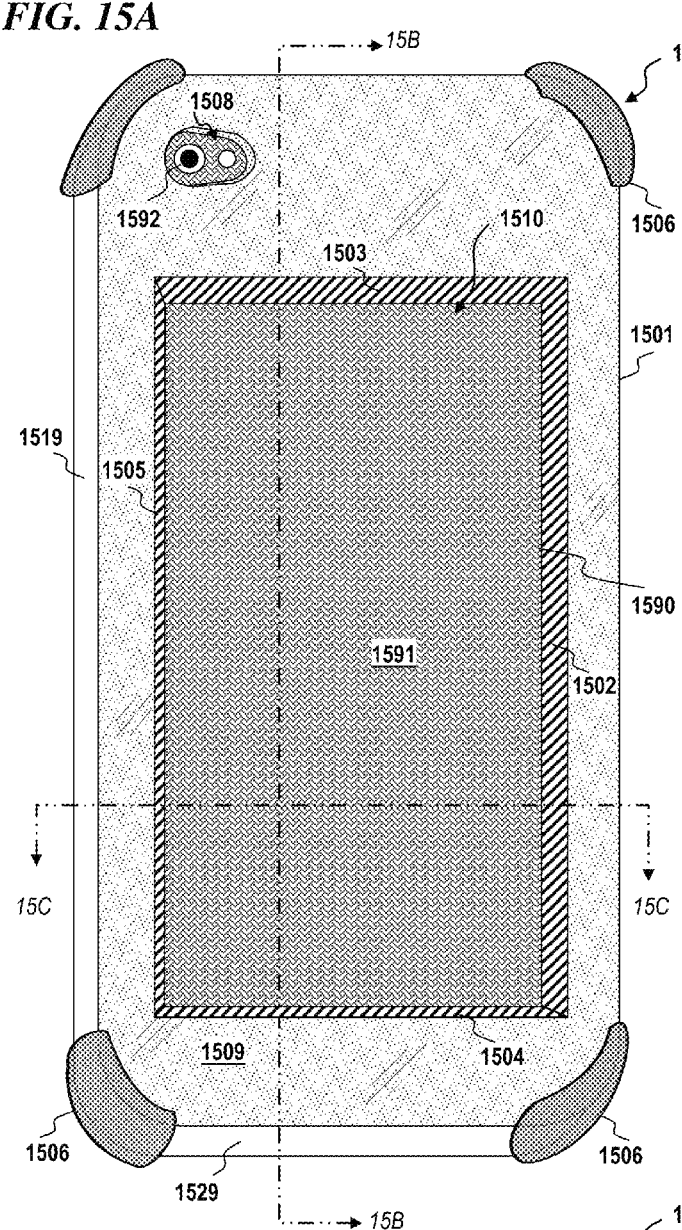
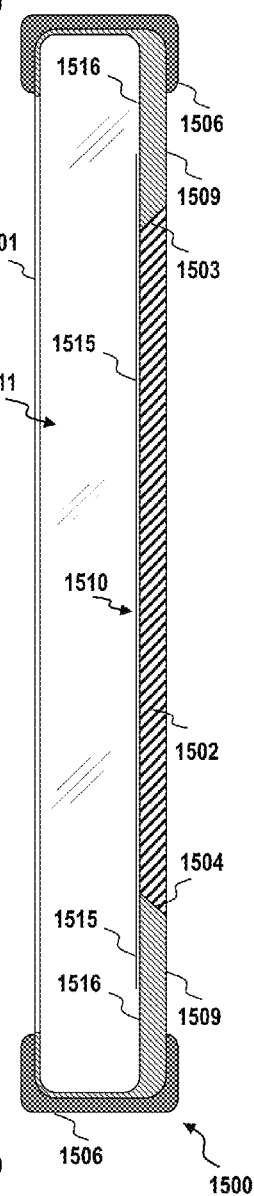
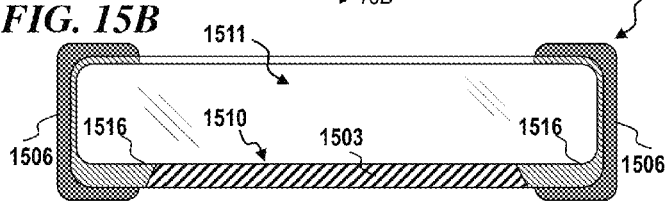
FIG. 15B

ENHANCED DETACHABLE SENSORY-INTERFACE DEVICE FOR A WIRELESS PERSONAL COMMUNICATION DEVICE AND METHOD

CROSS-REFERENCE TO RELATED APPLICATIONS

This is a U.S. national-stage patent application under 35 USC §371 from, and claims priority benefit under 35 USC §365(a)-(c) of, PCT Application No. PCT/US2013/037867 filed Apr. 23, 2013 with the title "Detachable sensory-interface device for a wireless personal communication device and method," which claims priority benefit of U.S. Provisional Patent Application No. 61/687,293, filed on Apr. 23, 2012 and titled "Capacitive touch case (1 of 2)/remote transmission microphone (2 of 2)," U.S. patent application Ser. No. 13/844,067 filed on Mar. 15, 2013 by Andrew C. Kamin-Lyndgaard and titled "Detachable sensory-interface device for a wireless personal communication device and method," and U.S. Provisional Patent Application No. 61/814,336, filed on Apr. 21, 2013 by Andrew C. Kamin-Lyndgaard and Paul J. Sadler and titled "Enhanced sensory mobile protection case with user-customizable options," each of which is incorporated herein by reference for all purposes in its entirety.

This invention is also related to prior U.S. Provisional Patent Application No. 61/401,765, filed on Aug. 19, 2010, titled "Method and devices for customizable integration of smart accessories that integrate with a wireless phone, reader, tablet or other communications device," and to U.S. patent application Ser. No. 13/494,004, filed on Jun. 11, 2012, titled "Method and apparatus for remote capture of audio in a handheld device"(which issued as U.S. Pat. No. 8,965,026 on Feb. 24, 2015), each of which is incorporated herein by reference for all purposes in its entirety.

FIELD OF THE INVENTION

This invention generally relates to a method for mobile personal computer input-output user interface and devices, and more particularly for developer or user-centric, customizable finger-and-hand gesture recognition, operational control and integration of smart accessories for a mobile personal computer (such as wireless phone, reader, tablet or other communication device) that utilize sensory interfaces. Some embodiments include novel sensory components that enhance user interface of the protected mobile computing device with software applications (referred to as "smart" accessories or "appcessories") and including sensors or other I/O within the mobile-device enclosure to more effectively add user-interface options between the human user and the software applications on the mobile device.

BACKGROUND OF THE INVENTION

U.S. patent application Ser. No. 13/844,067, filed Mar. 15, 2013 by Kamin-Lyndgaard and titled "Detachable sensory-interface device for a wireless personal communication device and method," is incorporated herein by reference. Application Ser. No. 13/844,067 describes a method for mobile personal computer input-output interface and devices.

As mobile electronics continue to evolve, limitations between the data management, digital input and output and user interfaces, and the software applications embedded in the device and applications available via the internet, are becoming increasingly more evident. Designers have built various mobile device cases for the purpose of protecting the devices from weather elements or submersion in water or other liquids, and for impact resistance. Traditionally, external input has been limited to the touch interface on the face, or screen, of the mobile devices. There are several examples of external keyboards that interface with the mobile devices via a wireless or a direct physical connection.

As human users continually spend more time with their mobile devices, software developers are providing more and more options and features of the software applications they are writing that are accessible via mobile devices. Mobile devices are becoming more useful to human users because of extended battery life and the additional benefits and features that are provided with the actual mobile devices and the various external accessories that interface with the devices. However, up until the present invention, there is not a user-centric platform wherein the user can define the software parameters of the data input and output from sensors and hardware accessories. Various prior-art methods attempt to provide solutions to the issues and problems the current invention solves.

U.S. Patent Application Publication US 2012/0007822 of Tong Luo, filed on Sep. 1, 2011, with the title "DETACHABLE BACK MOUNTED TOUCHPAD FOR A HAND-HELD COMPUTERIZED DEVICE," is incorporated herein by reference. Luo describes a detachable touchpad for a handheld computerized device. This detachable touchpad is configured to reversibly attach to the back of a handheld computerized device that lacks a rear mounted touchpad, and with appropriate software, allow the user to at least in part control the handheld computerized device from behind the device.

U.S. Patent Application Publication US 2011/0021251 of Johan Linden, filed on Jul. 22, 009, with the title of "ELECTRONIC DEVICE WITH TOUCH-SENSITIVE CONTROL," is incorporated herein by reference. Linden describes a user input device on a surface of the phone different than the surface on which the user views information displayed on a display thereof. For example, an electronic device, such as a mobile phone, can have a display on a front side and a user input device such as a touchpad on a backside. The mobile phone can be cradled in a user's palm while being securely grasped on edges thereof by the thumb and forefingers of the user's hand. The touchpad, being located on the backside of the device, can be operated by a user's index finger, for example.

U.S. Patent Application Publication US 2007/0103454 by John Elias, filed on Jan. 5, 2007, with the title of "BACKSIDE INTERFACE FOR HAND-HELD DEVICES" is incorporated herein by reference. Elias describes an electronic device that uses separate surfaces for input and output. One of the surfaces (e.g., the bottom) includes a force-sensitive touch-surface through which a user provides input (e.g., cursor manipulation and control element selection). On a second surface (e.g., the top), a display element is used to present information appropriate to the device's function (e.g., video information), one or more control elements and a cursor. The cursor is controlled through manipulation of the back-side touch-surface.

U.S. Pat. No. 5,543,588 to Bisset, et al. issued Aug. 6, 1996, with the title "Touch pad driven handheld computing device" is incorporated herein by reference. Bisset describes a handheld computing device comprises a thin enclosure having two opposing major faces. A display screen is disposed on a first one of the major opposing faces of the enclosure and a touch-sensitive object position detector input device is disposed on a second one of the major opposing faces of the enclosure. Computing device circuitry, circuitry for interfacing the touch-sensitive object position detector to the computing device circuitry, and circuitry for driving the display screen are all disposed within the enclosure.

U.S. Patent Publication 20130076612 titled "ELECTRONIC DEVICE WITH WRAP AROUND DISPLAY" by Scott Myers, published Mar. 28, 2013, and is incorporated herein by reference. Myers describes a consumer electronic product includes at least a transparent housing and a flexible display assembly enclosed within the transparent housing. In the described embodiment, the flexible display assembly is configured to present visual content at any portion of the transparent housing.

There remains a need in the art for improved user input interfaces for mobile devices specific to separate, protective clip-on enclosures.

SUMMARY OF THE INVENTION

The evolution of enabling a "smart" apparatus that provides protection from damage or impact to the connected mobile device, while providing added interfaces and controls with customizable touch-sensitive sensors on the back and sides of the protection apparatus as further described below.

In some embodiments, the present invention provides a method for implementing and using a sensory-interface device. The method includes: providing a protective case having plurality of touch-sensitive sensors; attaching the touch-sensor case to a user's mobile device; providing a communications mechanism configured exchange data between the protective case and a user's mobile phone; sensing touch of a user on the case; sensing a gesture made by the user on one of the touch sensitive surfaces; generating a first authentication code that is personal to the user based on the sensed gesture; combining the first authentication code with a device authentication code to generate a combined personal-and-device authentication code that enables a software function of the mobile device; and gathering data from a plurality of sources for compilation into at least one touch-sensitive device; wherein the data can be sent to remote satellite devices; wherein the data is searchable from a database that is internal to the touch-sensitive device that is accessible through a communications network. In some embodiments of the method, the sensed gesture is a grip, and determining from the sensed grip whether the user is holding the device with a left hand versus a right hand.

In some embodiments, the present invention provides a computer-readable medium having instructions stored thereon, wherein the instructions when executed by a suitable information processor, perform a method that includes: receiving a signal that includes parameters from a gesture made by a user on a protective case having a touch sensor, wherein the touch-sensor case is attached to a user's mobile device; generating a first authentication code that is personal to the user based on the gesture; combining the first authentication code with a device authentication code to generate a combined personal-and-device authentication code that enables a software function of the mobile device; and gathering data from a plurality of sources for compilation into at least one touch-sensitive device; wherein the data can be sent to remote satellite devices; wherein the data is searchable from a database that is internal to the touch-sensitive device that is accessible through a communications network.

In some embodiments, the present invention provides an apparatus that includes: a protective case that has touch capacitive sensors, wherein the touch-sensor case is configured to be attached to a user's mobile device; sensors in the case configured to sense a gesture made by the user; gesture detector operably connected to the sensor; and a user-authentication generator operably coupled to the gesture detector and configured to generate a first authentication code that is personal to the user based on the gesture.

As the invention of U.S. patent application Ser. No. 13/844,067 of Kamin-Lyndgaard enhances the user interface with mobile devices by expanding the actual surface area of user input and output through the use of external sensory components, some embodiments of the present invention improve on that method and design. In some embodiments, the protective case of the present invention encloses the back of a mobile device such as a wireless phone; in another embodiment, the case surrounds a tablet computer.

In some embodiments, the present invention includes an electronic device that provides for a way to enhance the user experience by providing for sensory inputs and/or outputs on a protective enclosure of a wireless mobile electronic device.

In some embodiments, the present invention provides a unique and novel case design to provide external user input sensors when a mobile device incorporates sensory components on the back of the mobile device. In some embodiments a phone which has touch-sensory surfaces located on the back of the phone itself would not benefit the user who uses a case or other protective enclosure that covers this surface. In the present invention, the back of the phone would be exposed to enable the user to access the touch-sensory components located on the phone itself. In some embodiments this invention provides for a thin layer of sensory material that covers the sensors located on the back of the phone, providing access to use the sensory components on the back of the phone while providing a protective layer from potential damage from the elements.

BRIEF DESCRIPTION OF THE DRAWINGS

FIG. 15A is a perspective drawing of the back (reverse) side of a system 1500 that includes a device protective enclosure 1501 having protective properties for mobile computing device 1590, and which has a through-hole aperture 1510 having one or more edge surface areas 1502, 1503, 1504, and/or 1505 that provide space for one or more of the additional sensory components, according to some embodiments of the present invention.

FIG. 15B is an end cross-sectional drawing of the device protective enclosure 1501 shown in FIG. 15A as seen at section line 15B of FIG. 15A.

FIG. 15C is a side cross-sectional drawing of the device protective enclosure 1501 shown in FIG. 15A as seen at section line 15C of FIG. 15A.

DETAILED DESCRIPTION OF THE INVENTION

Figure 1:
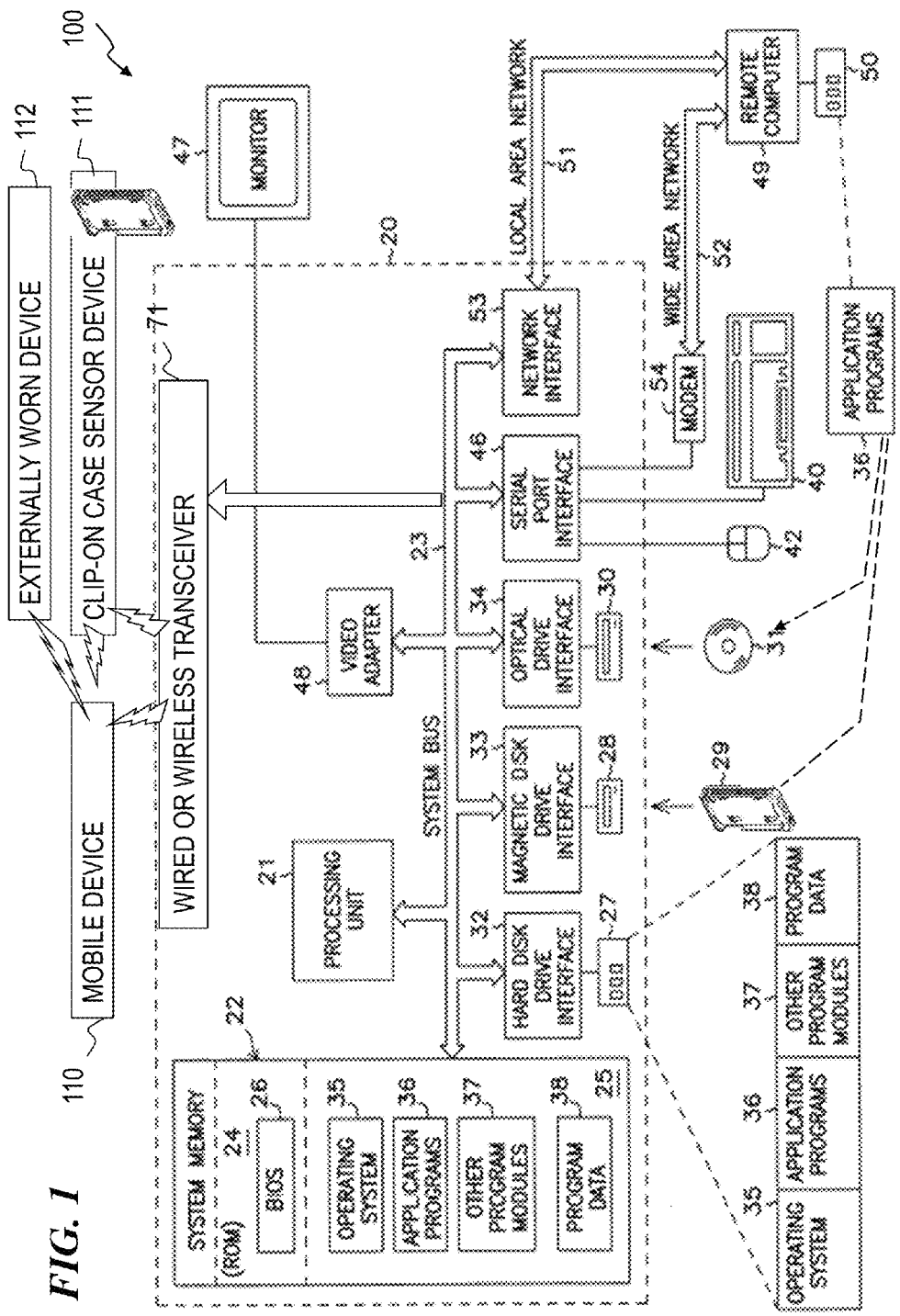
FIG. 1 is an overview block diagram of a hardware- and operating-environment (or system) 100 that is used in conjunction with some embodiments of the invention.

Although the following detailed description contains many specifics for the purpose of illustration, a person of ordinary skill in the art will appreciate that many variations and alterations to the following details are within the scope of the invention. Very narrow and specific examples are used to illustrate particular embodiments; however, the invention described in the claims is not intended to be limited to only these examples, but rather includes the full scope of the attached claims. Accordingly, the following preferred embodiments of the invention are set forth without any loss of generality to, and without imposing limitations upon the claimed invention. Further, in the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention. The embodiments shown in the Figures and described here may include features that are not included in all specific embodiments. A particular embodiment may include only a subset of all of the features described, or a particular embodiment may include all of the features described.

The leading digit(s) of reference numbers appearing in the Figures generally corresponds to the Figure number in which that component is first introduced, such that the same reference number is used throughout to refer to an identical component which appears in multiple Figures. Signals and connections may be referred to by the same reference number or label, and the actual meaning will be clear from its use in the context of the description.

In some embodiments, the present invention includes a method of data transfer between a separate yet attached apparatus to a mobile communication device. The apparatus contains proprietary applications to optimize and navigate data interfaces via software and at least one controller to a mobile electronic device.

In some embodiments, an internet-enabled software-development kit enables a method wherein developers (who could also be defined as the first, primary user) can program and customize the sensory components on the apparatus for the benefit of optimizing their individual software applications.

In some embodiments, the apparatus is designed to connect to clip-on or otherwise encompass a mobile electronic device, iPhone®, tablet or a similar device. The invention device is designed for impact protection to mitigate damage should the device be dropped from a height that may otherwise damage the mobile device.

A conventional user interface on a mobile device (such as a smartphone or tablet computer) is traditionally limited to the user input derived from a touch screen or display. Software application developers therefore have few choices available for input from users because of this limitation, even though applications are becoming more and dynamic and robust and complex. When users use the touch screen of mobile devices they are interfacing with their device. An additional aspect of the user interface problem is the insufficient number of options for customizable user interfaces.

In some embodiments, the present invention includes a sensory-interface device that clips or slips onto a personal computing and/or communications device such as a smart cell phone (smartphone), tablet, or data assistant (such as a Blackberry® or an Apple® iPad®, iPhone®, or the like). A personal computing and/or communications device such as this is generally referred to as a "mobile device" herein. In some embodiments, the present invention includes a partial case or cover for the mobile device configured such that none of the built-in controls and inputs of the mobile device (touchscreen display, volume control, on/off button, and so on) are covered or otherwise interfered with. There exists a surface area on the back and/or the sides of the present invention that is sensitive to touch (or other stimuli such as heat, light, sound, and the like). Some embodiments include a plurality of touch sensitive surface areas on the back and/or the sides of the present invention. In some embodiments, the touch-sensitive surface areas can sense and interpret multiple simultaneous contacts with the touch surface, that is, the touch surface supports multitouch. Some embodiments include an apparatus and a software-development kit that enables any developer to take advantage of the available touch-sensitive surface area(s) on the back and/or sides of the apparatus. Developers can implement software applications that enable users to interface with the mobile devices and the software applications in a customizable way never before available for the developer community.

In some embodiments, the present invention includes the necessary electronics to detect a finger or other object touching the touching the touch-sensitive areas on the sensory-interface device. In some embodiments, these electronics include a microprocessor and the microprocessor's program and data memory. In some embodiments, the sensory-interface device communicates with applications (software) executing on the attached mobile device, providing the applications on the mobile device with information about the state of the touch-sensitive surface(s). Such state information includes, in various embodiments, the number of regions currently being touched, the location of the regions being touched, the size of the regions being touched and the pressure being exerted on the surface by the touching objects. In some embodiments, the touch-sensitive areas can be dynamically configured into a set of virtual buttons. The configuration can be done either by software running on the mobile device, or by software running on a microprocessor included in the invention. A "virtual button" is a region of the touch-sensitive surface that is treated as a single spot or area, that is, a touch (or some other contact) anywhere a virtual button's region is interpreted in the same way: as a press of the virtual button. The information relating to a press of a virtual button is used by the sensory-interface device itself (say in software running in the sensory-interface device's microprocessor), and can also be communicated to software running in attached mobile device. Such virtual button press information includes, but is not limited to, the fact that a virtual button is pressed and released quickly, that a virtual button has just been pressed, that a virtual button has been released, and the pressure with which the virtual button was pressed.

Virtual buttons are dynamically configured by software (say software running on the attached mobile device), and can be configured in a wide variety layouts, depending on the use and desire of the programmer and/or the user of the sensory-interface device. For example, for use with a video game running on the mobile device, virtual buttons are configured on the touch-sensitive surface to approximate the layout of buttons found on a game console (such as a Microsoft Xbox 360®) controller. For another application, virtual buttons on the touch-sensitive surface are configured as a phone keypad to facilitate phone dialing. For text input, the virtual buttons on the touch-sensitive surface are configured as a QWERTY (or other text input layout) keyboard. Text input could also employ the virtual keys configured as stenotype machine keyboard or other chorded keyboard or input device. (A "chorded" input device allows a user to enter data (which could be text or commands of some sort) by pressing several keys simultaneously, like playing a chord on a piano.) Other examples include configuring the virtual buttons on the touch-sensitive surface as a keyboard for Braille input (such as the 9-key Perkins keyboard), or for input of Chinese, Japanese or other ideographic text.

In some embodiments, regions on the touch-sensitive surface are configured as virtual sliders or other linear controls. The information relating to operation of a virtual slider is used by the sensory-interface device itself (say in software running in the sensory-interface device's microprocessor), and can also be communicated to software running in attached mobile device. Virtual slider information includes, but is not limited to, whether or not the slider is being touched, and where along the length of the slider (say as a percentage of the length of the virtual slider) the touch is occurring. Examples include a scroll bar (for information being displayed on the front of the attached mobile device), a virtual volume control, and a virtual zoom control for an attached mobile device's built-in camera.

In some embodiments, regions on the touch-sensitive surface are configured as the virtual knobs or other rotary controls. The information relating to operation of a virtual knob is used by the sensory-interface device itself (say in software running in the device's microprocessor), and can also be communicated to software running in attached mobile device. Virtual knob information includes, but is not limited to, whether or not the knob is being touched, how far the user has rotated the virtual knob, and the rate of rotation. One example for the use of a virtual knob is a virtual "jog dial", the control used by a DJ (disk jockey) when playing digitally recorded music to alter the rate and direction of music playback, allowing the DJ to perform techniques such as beat matching and scratching when playing digitally recorded music. (This is analogous to manipulating a turntable while playing a conventional vinyl record.) The recorded music played could be stored on the attached mobile device. In some embodiments, the present invention could control a remote playback device making use of the attached mobile device's wireless communication capabilities (for example, Bluetooth® or Wi-Fi®). Another example of a virtual knob is a virtual volume control.

The above examples of virtual controls are narrow and specific used to illustrate particular embodiments; however, the invention described in the claims is not intended to be limited to only these examples. A person of ordinary skill in the art will appreciate that many variations and alterations of virtual controls are within the scope of the invention.

In some embodiments of the present invention, the touch-sensitive area on the back of the sensory-interface device is simply mapped to the touch screen of the attached mobile device. That is, touches and gestures made on the back of the detachable case or cover (i.e., the present invention) have the same result as touches and gestures made on the front touch screen of the attached mobile device. In some embodiments, partially transparent images are displayed on the attached mobile device's front display, wherein the image represents the locations of touches being made on the back touch-sensitive surface.

Some embodiments of the present invention include gesture detection. As used herein, a gesture is the movement of one or more contacts locations on the touch-sensitive surface on the back of the sensory-interface device. Examples of gestures include a single finger tracing a path on the touch-sensitive surface and two fingers making pinch-in and pinch-out movements (say to zoom an image smaller or larger). In some embodiments, the gesture information is communicated to software running on the attached mobile device. In some embodiments, the gesture information is used by the sensory-interface device itself. In some embodiments, gestures are used by the sensory-interface device for security purposes, as a "password" equivalent to unlock or enable the sensory-interface device or specific functions on the sensory-interface device, or to access data stored on the sensory-interface device itself. In some embodiments, where a sensory-interface device includes multiple touch-sensitive surfaces, a gesture can include touches on more than one of the touch-sensitive surfaces. For example, a user's grip on a sensory-interface device (part of a palm and parts of some fingers touching the back, and parts of fingers touching sides and edges (which in this example contain touch-sensitive surfaces) can be considered a single gesture.

In some embodiments, the sensory-interface device (case or cover) connects to and exchanges information with the attached mobile device though the use of a wireless communication mechanism such as Near-Field Communications (NFC) or Bluetooth®. In other embodiments, the sensory-interface device exchanges information with the attached mobile device though the use of a physical connection. A physical connection between the invention and an attached mobile device may provide electrical power. In some embodiments, power is supplied from the attached mobile device to the case or cover. In other embodiments, the case or cover contains a battery and can supply reserves electrical power to the attached mobile device.

In some embodiments, the present invention includes non-volatile data storage integrated on the sensory-interface device. Such storage could be implemented with flash memory or other suitable non-volatile storage technology. This storage is available to the user. In some embodiments, data stored in the on-board storage is encrypted providing a secure facility for storing sensitive information. In some embodiments, some form of user authentication is required in order to access and decrypt the encrypted data. One form of authentication employed in some embodiments is biometric authentication based on gestures. To authenticate oneself, the user draws a pattern on the touch-sensitive surface. The sensory-interface device captures information about the gesture, measuring parameters such as the specific path of the gesture, including gesture-segment paths and corner locations, the speeds at which the various segments of the gesture are made, and the changes in pressure exerted by the finger (or stylus) as the gesture is made. The captured information is compared to reference gesture information stored in the sensory-interface device's secure memory to determine if the just-entered gesture sufficiently matches the stored gesture parameters. If it does, the user is authenticated and access is granted. Prior to using biometric authentication, the sensory-interface device is trained. One method of training includes having a user repeatedly trace an unlocking gesture on the touch-sensitive surface while the sensory-interface device analyzes the gestures and develops a parameterized model of the gesture. A plurality of gestures, each for a different secure purpose, can be stored and used with a single sensory-interface device. Entering a particular gesture can cause the sensory-interface device to simply grant access to some stored data. In some embodiments, entering a particular gesture can cause the sensory-interface device to perform some action.

Data secured in the on-board sensory-interface device encrypted storage can include personal information, confidential data, and access control information. The following is one example of access control information stored in a sensory-interface device. A user wishes to access a secure facility, say a drug storage cabinet. Access to such a cabinet is very restricted. In order to get access to this drug storage cabinet, an individual must prove one's identity. Using the present invention, the user draws the required gesture on the touch-sensitive surface on the back of the sensory-interface device. The sensory-interface device analyzes the entered gesture to see if it matches any gesture stored in the sensory-interface device's secure storage. If it does, the sensory-interface device performs the action associated with the entered gesture. In this example, once the user is authorized, a security code is retrieved from secure storage. In some embodiments, this security code is transmitted to the drug storage cabinet's access control system over a secure radio link from a wireless device that is included in the sensory-interface device itself. Such a wireless link could employ a proprietary highly-secure communication protocol specific to the manufacturer of the drug cabinet's access control mechanism. The transmitted security code uniquely identifies the user, and the drug cabinet's access control mechanism can determine if this individual should be granted access. The result is a highly secure mechanism for access control. It requires both the specific sensory-interface device belonging to an individual and that individual's biometrically authenticated gesture in order to get access to the secured facility. This above mechanism can also be used to control access to information, for example, patient information in a hospital. A user would be required to biometrically authenticate himself, using his personal sensory-interface device, before being granted access to patient information, either on the attached mobile device or a separate hospital terminal.

In some embodiments, once a user is biometrically authenticated, data is extracted from the secure on-board storage, decrypted, and sent to an application running on the attached mobile device. In some embodiments, this information includes a password or a security code that is then transmitted by the attached mobile device's wireless capabilities (for example, Near Field Communications (NFC), Bluetooth®, or Wi-Fi) to a third device that requires the now decrypted information to grant access or, in the case of a digital wallet or an e-wallet, to complete a transaction.

In some embodiments, the present invention includes a fingerprint scanner. Biometric authentication optionally includes requiring the user to scan his finger, and verifying the user's finger print with finger print information stored in the secure sensory-interface device storage. In some embodiments, the present invention includes a microphone to receive audio signals. Biometric authentication optionally includes requiring the user to speak a word or phrase (or make some other repeatable sound), analyzing the input audio signal and verifying the parameters of the spoken word or phrase match those stored in the secure sensory-interface device storage.

In some embodiments, the touch-sensitive surface of the invention includes a capacitive touch sensor. In other embodiments, the touch-sensitive surface of the present invention includes a resistive touch sensor. In other embodiments, the touch-sensitive surface of the present invention includes an infrared grid touch sensor. In other embodiments, the touch-sensitive surface of the present invention includes an acoustic pulse recognition touch sensor. In some embodiments, wherein the sensory-interface device includes a plurality of touch-sensitive surfaces, individual sensors may employ different touch sensing technologies. The above examples of touch sensing technologies are used to illustrate particular embodiments; however, the invention described in the claims is not intended to be limited to only these examples. A person of ordinary skill in the art will appreciate that many variations touch sensing technologies are within the scope of the invention.

As used herein, "senspresence" means detecting the occurrence of a combination of one or more parameters sensed by the present invention, such as a user's grip on the device, finger placement, pressure and movement, or the like, and automatically taking some action based on the detected parameter. For example, in some embodiments, the sensory-interface device automatically turns on when a user gripped the device in a particular way. As used herein, "sensfeedback" is the sensory feedback provided by the sensory-interface device and includes haptic feedback (vibrations or changes in surface texture, audio feedback and visual feedback). The specific feedback provided in any instance is based on data compiled by the back-and-side touch-sensitive surfaces of the present invention in combination with data from the front face of the attached mobile device and/or applications running on the attached mobile device.

As used herein, "sencode" is a combination of sensory data points that provides for authentication for one user. As used herein, "senscode" (in contrast to "sencode") is a combination of sensory data points that provides for authentication of a group of users.

One embodiment of the present invention includes included in the Sensus™ Touch Sensitive Case for smartphones that expands the functionality of a smartphone. It provides application program interfaces to customize the operation of the touch-sensitive surfaces of the case, and to provide haptic feedback for improved sensory sharing.

This invention enables senspresence, which provides a more meaningful and emotive user interface experience. In one example, senspresence enables one user with the attachable sensing apparatus of the present invention to provide sensory data remotely with another user who has a similar attachable sensing apparatus (referred to herein as "telepresence"). In another example, "sensfeedback" enables users to engage in data input and output to each other and additional users in a peer to peer network based upon the sencode and senscode previously defined.

In another embodiment, game applications of the present invention incorporate the sensory input and output from devices of multiple players, optimizing the user interface by providing customized gesturing controls via programmed user preferences. In some embodiments, the sensory-interface device also enables automatic user authentication via programmable software applications that in some examples connect with the software running on the microprocessor embedded in a sensory-interface. In other examples, the software enables data authentication and preferences to be stored in the embedded storage of a sensory-interface device.

In some embodiments, the software application interaction of the present invention includes an application level of software utilizing code running on the attached mobile device. In other embodiments, software running on the attached mobile device enables the reversing of the front display of the attached mobile device to the back of the phone (e.g., in some embodiments, the user can thus hold the device such that the normal "front" display touch screen (which usually faces the user) is instead facing away from the user, enabling the user to use fingers of both hands on the display's touch sensor at the same time).

In some embodiments, data and/or software is stored in firmware in the root directory of the sensory-interface device. In some embodiments, associated sensory-interface device software that runs on the attached mobile device is stored in the root directory of the attached mobile device.

In one embodiment, the sensory-interface device has a protocol that extends the invention off of the case or the phone, with an agnostic user interface, application, or operating system.

In some embodiments, the sensory-interface device uses a communications protocol to extend the sensory-interface device's function beyond the sensory-interface device itself or the attached mobile device. In some embodiments, the present invention provides an agnostic user interface for use with a variety of applications and/or operating systems.

In some embodiments, wherein the attached mobile device is wearable, head-mounted display (for example, Google Glass) the present invention includes gesture-based input. Touch-sensitive surface(s) are attached to portions of the wearable, head-mounted display (on the temples of the frame, for example), enabling gestures on the touch-sensitive surface(s) to provide input to the display device. In some embodiments, the gestures recognized by the sensory-interface device include a forward swipe, a backward swipe, various tap sequences (single long tap, single short tap, double tap, etc.) and a downward swipe.

In some embodiments, the sensory-interface device is configured to broadcast data, and in some examples the data is encrypted with an encryption method that is embedded in to the sensory-interface device. In other embodiments, the encryption method utilizes code running of the attached mobile device combination code running on the sensory-interface device itself.

One embodiment of the present invention includes included in the Restaurant Canopy® which provides touch-sensor-based embodiments of ordering and transaction processing. These embodiments include one or more of: security and other sensors, user programmable sensors, unique IDs, and online digital signature authentication (i.e., verifying a signature is authentic by measuring parameters of the writing of the signature such as writing speed, writing pressures, etc.).

FIG. 1 is an overview diagram of a hardware- and operating-environment (or system) 100 that is used in some embodiments of the present invention. The description of FIG. 1 is a brief, general description of suitable computer hardware and software environment with which software (applications and control program) used with the invention may be implemented. This software may run on the sensory-interface device, or on the attached mobile device. In some embodiments, the invention includes described in the general context of computer-executable instructions, such as program modules, that are stored on computer-readable media and that are executed by a computer, such as a microprocessor residing in a sensory-interface device and/or in an external device worn by the user and/or personal computer that is/are wirelessly linked to the sensory-interface device. Generally, program modules include routines, programs, objects, components, data structures, and the like, that perform particular tasks or implement particular abstract data types.

In some embodiments, FIG. 1 is a system 100 that includes a user or developer (not shown, and programmable user-controlled computer 20 that includes a wireless transceiver 71 that allows wireless management and control (i.e., reprogramming of the remote microprocessors) of an attached mobile device 110 (which includes a programmable microcontroller), and/or a sensory-interface device 111 or a worn device 112 (which also includes a programmed microcontroller), both of which wirelessly communicates with and, in some embodiments, provides power to, the attached mobile device 110. In some embodiments, application programs 36 stored on a computer-readable optical storage medium 31 (e.g., CDROM, DVD, Blu-ray Disc™ (BD), or the like) read and written with an optical storage drive 30 attached to the computer via an optical drive interface 34. In some embodiments, application program are stored on a magnetic hard drive 27 attached to the computer via a hard drive interface 32. Additionally, the magnetic hard drive may store the computer operating system 35, other program modules 37 and program data 38. In some embodiments, the magnetic storage media is removable (e.g., a floppy disk) and read by a removable magnetic storage drive 28 attached to the computer via a removable magnetic storage drive interface 33. In some embodiments, application programs are stored on second instances of a sensory-interface device 29. In some embodiments application programs are stored on a storage device 50 connected to a remote computer 49 that connects to computer 20 across a local-area network 51 and network interface 53, or a wide-area network 52 and modem 54. Application program 36 contain instructions and/or control structures (such as look-up tables, control parameters, databases and the like) that are processed and/or transmitted into the attached sensory-interface device 111 the sensory-interface device's operation or attached mobile device 110 to control the attached mobile device's operation. In some embodiments, the applications programs 36 are partially executed in the computer 20 and/or the externally worn device 111, and then partially executed in the attached sensory or mobile attached device 110.

In some embodiments, application programs 36 are stored on a computer-readable solid state storage devices (e.g., thumb drive, flash drive, or SDHC™ (Secure-Data High-Capacity) memory card or the like), read and written with a solid state storage reader (not shown).

In some embodiments, the computer 20 includes a processing unit 21 in which program run, a video adapter 21 and monitor 47 to provide output to a user, a mouse 42 and keyboard 40 attached via a serial interface 46 to accept input from a user, and system memory 22. The polarity of computer hardware components are interconnected with a system bus 23. System memory 22 includes read only memory (ROM) or flash memory that contains the computer's BIOS, random access memory 25 that contains running versions of the operating system 35, application programs 36, other program modules 37 and program data 38.

Figure 2:
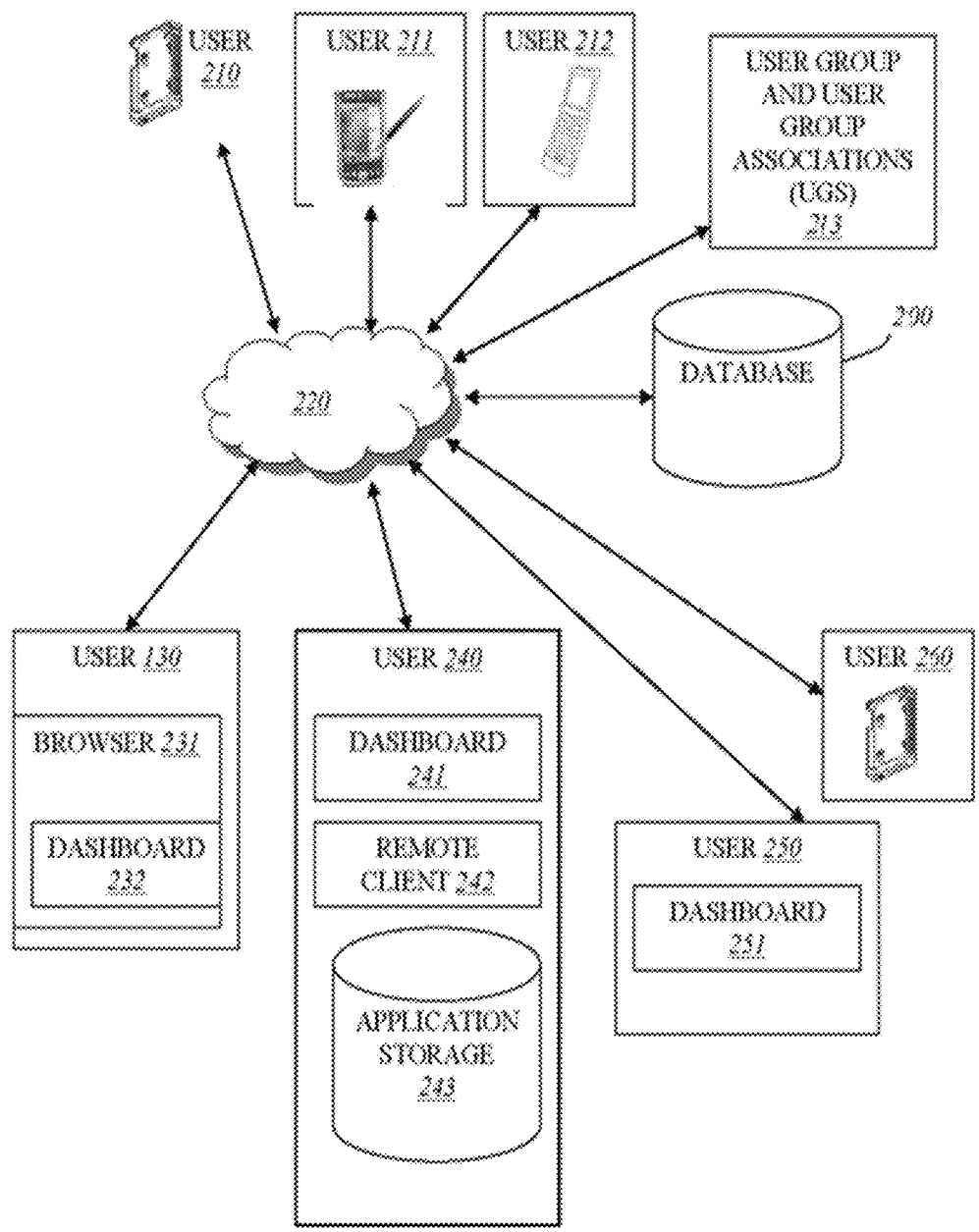
FIG. 2 is a block diagram illustration of data transfer between a sensory-interface device user and various other devices, according to some embodiments of the present invention.

FIG. 2 is an illustration of one embodiment of the invention wherein data are wirelessly transferred from a user 210 operating an instance of a sensory-interface device via the internet 220 (or an intranet) to any or all of plurality of users, devices and storage media. This plurality includes users of other mobile devices 211 and 212 (e.g., smartphones or tablets), other users as groups 213, another user with a second instance of the present invention 260, network connected storage or databases 200. In some embodiments, the user 130 of a sensory-interface device is connected wirelessly to the internet with a browser 231 and a dashboard 232 running on the sensory-interface device. In other embodiments, a user 240 of a sensory-interface device is connected wirelessly to the internet using a dashboard 241 with a remote client 242 and application storage 243 embedded within the sensory-interface device. In other embodiments, a user 250 of a sensory-interface device utilizes a dashboard 251 in a separate mobile device operating environment.

Figure 3:
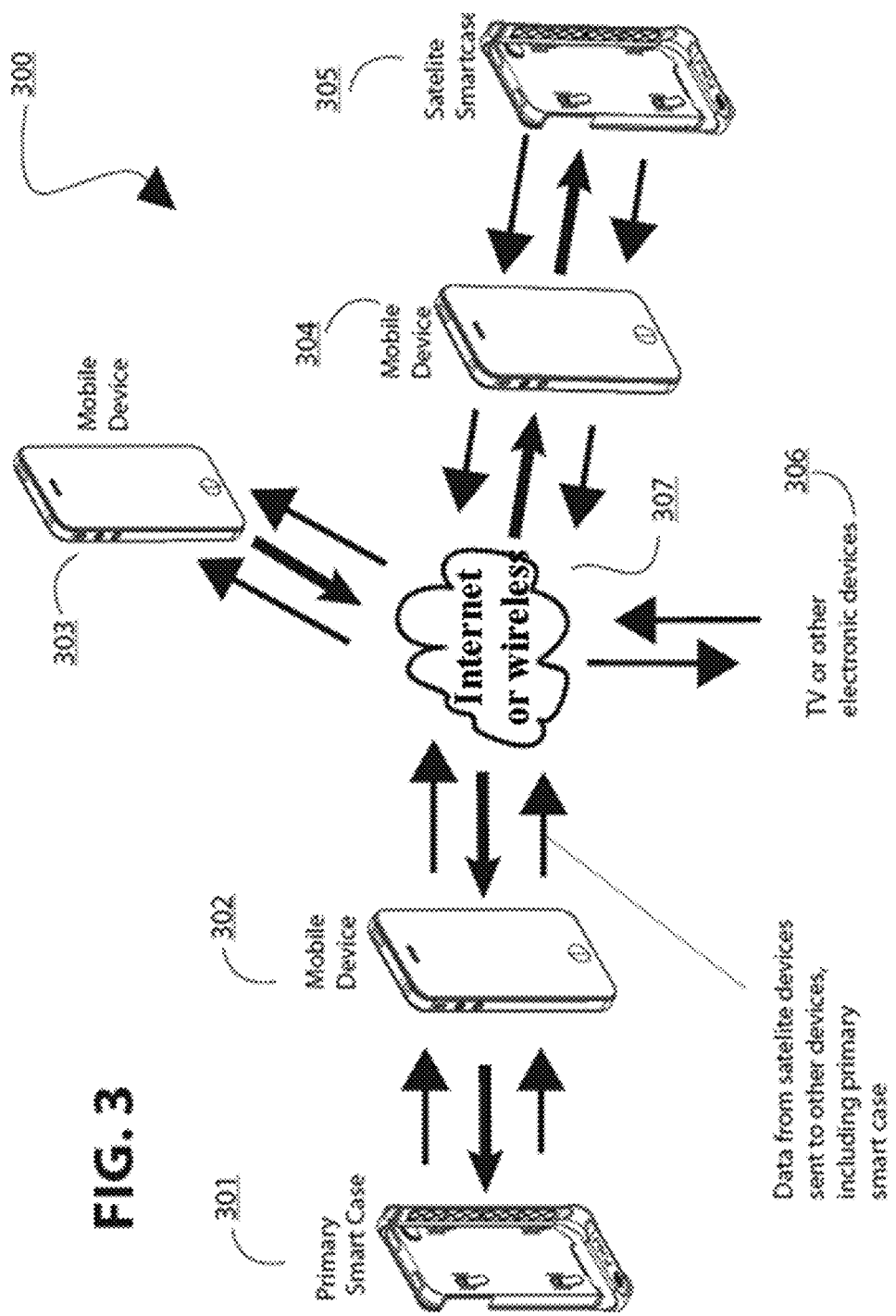
FIG. 3 is an illustration data transfer between a first sensory-interface device and a second sensory-interface device, according to some embodiments of the present invention.

FIG. 3 is an illustration data flow 300 from a first sensory-interface device to a second sensory-interface device. FIG. 3 also shows data interchange with other non-sensory-interface devices. Data from a first sensory-interface device 301 is transferred to the attached mobile device 302. In some embodiments, a wireless connection such as Bluetooth® or NFC is used. In other embodiments, a physical connection is used to transfer the data. The data is then transferred wirelessly from the attached mobile device 302 to the internet 307 or to some other wireless network such as a cell phone system's 4G or LTE network. The data is then transferred to a second attached mobile device 304 and then to a second instance of a sensory-interface device 305. Using this path, data can is exchanged between the two sensory-interface devices 301 and 305. Similarly, a sensory-interface device can communicate wirelessly with a mobile device 303 such as a smartphone, and with other wireless devices including televisions and game consoles 306.

Figure 4:
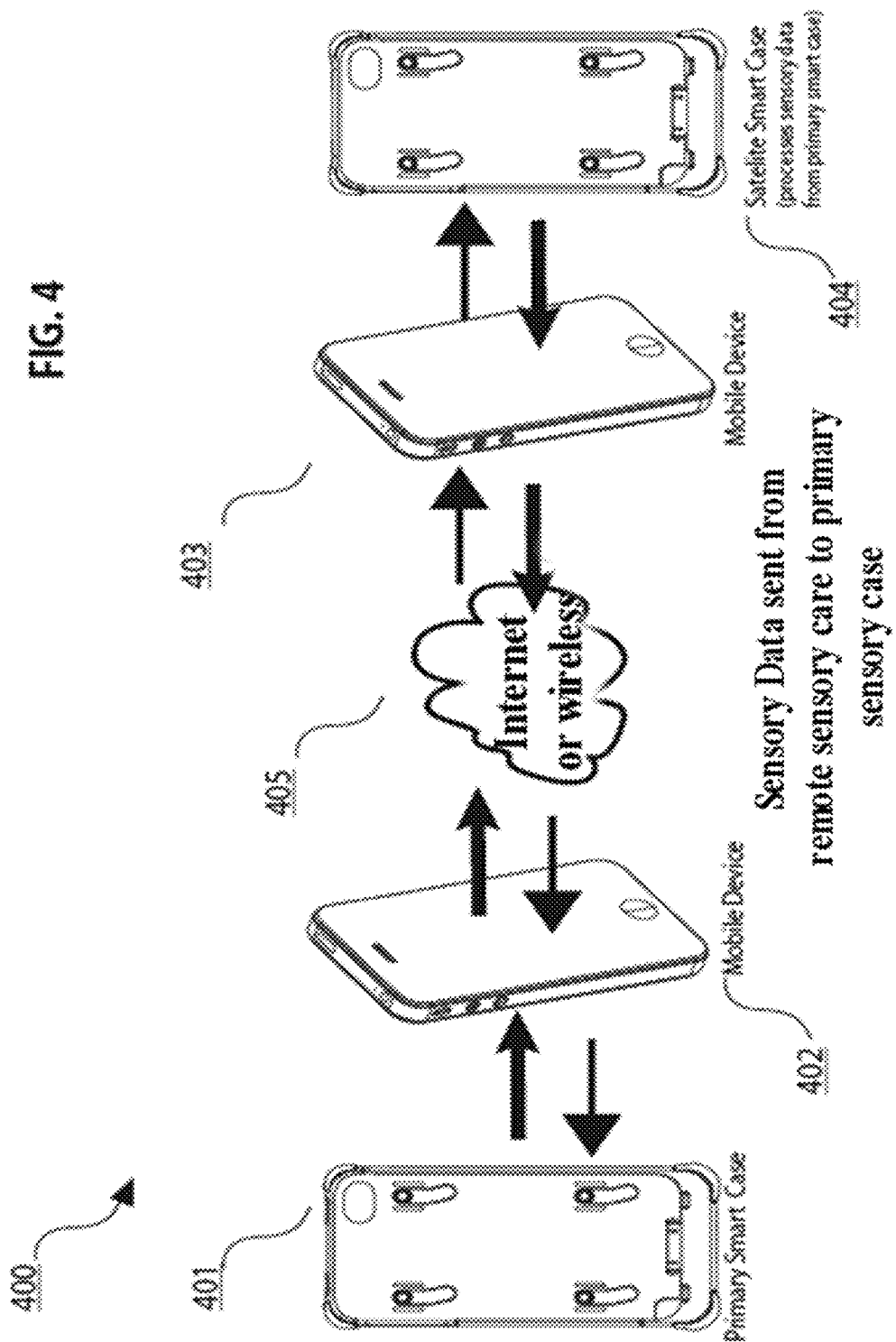
FIG. 4 is an illustration the transfer of sensory data between a first sensory-interface device and a second sensory-interface device, according to other embodiments of the present invention.

FIG. 4 is an illustration of the flow 400 of sensory data from a first sensory-interface device to a second sensory-interface device. In some embodiments, sensory data includes touches and gestures detected on the touch-sensitive surface(s) on the first sensory-interface device. As described above for FIG. 3, data, in this case sensory data, is transferred from the first sensory-interface device to the attached mobile device 402, then over a wireless network 405 to a second attached mobile device, and finally to a second sensory-interface device. In this example, the sensory data entered on the first sensory-interface device is processed on the second sensory-interface device. Such a facility would allow two individuals to interact as if they were sharing a single device, and is a desirable feature for functions like gaming and training. In some embodiments, sensory data is exchanged in both directions between the two sensory-interface devices.

Figure 5:
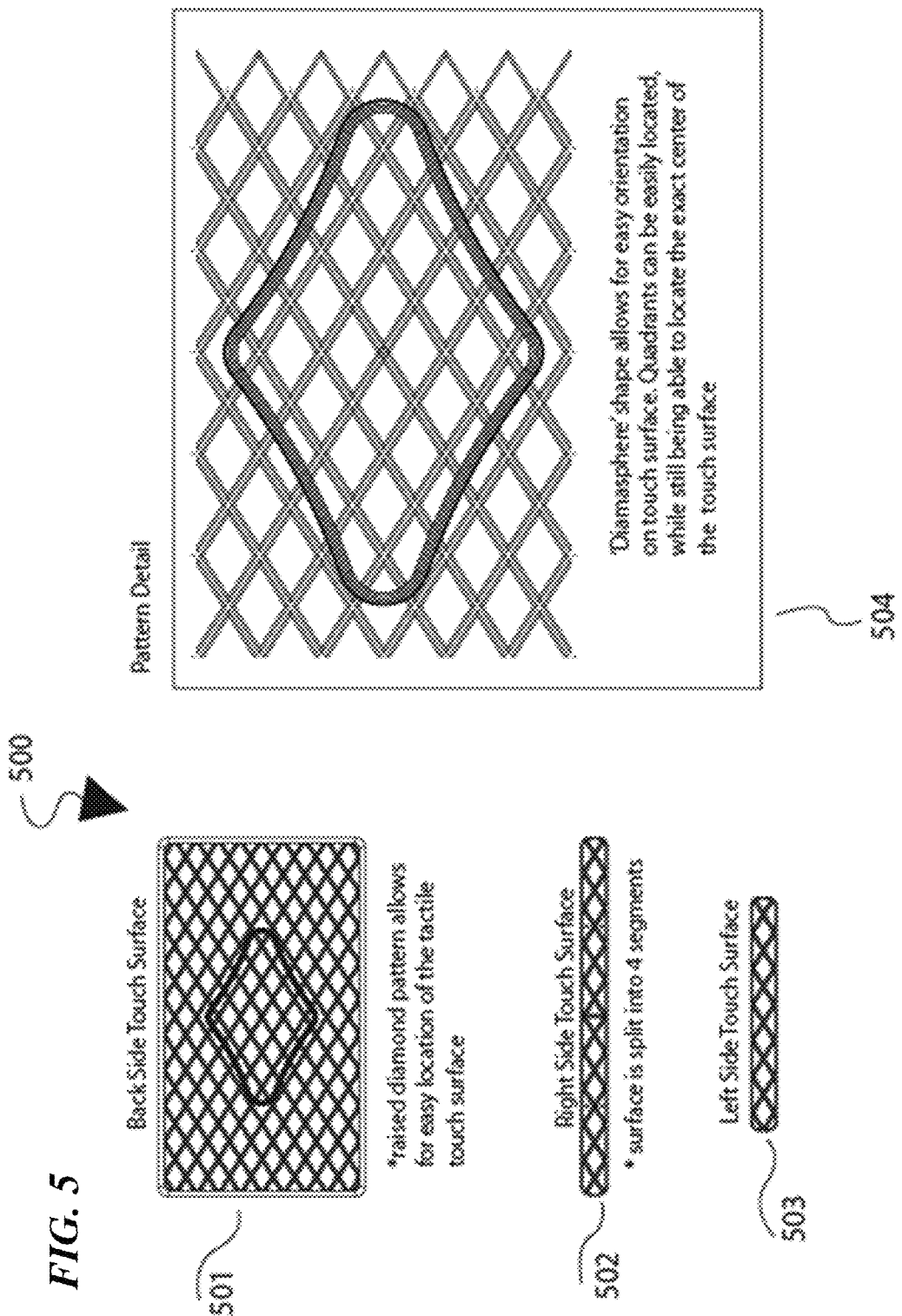
FIG. 5 is a back-and-side-views diagram of the embossed touch-sensitive surface on the back of a sensory-interface device, along with a detail view of the back, according to other embodiments of the present invention.

FIG. 5 illustrates the touch-sensitive surface(s) in some embodiments of the present invention. The back side touch surface 501 includes a raised diamond pattern easily detected by a user's fingers that allows for easy location of regions of the tactile touch surface. 504 is a detailed view of a "diamasphere" pattern which provides improved orientation of fingers on the touch-sensitive surface. Quadrants can easily be located while still being able to locate the exact center of the touch-sensitive surface. In some embodiments, the sensory-interface device includes a right side touch-sensitive surface 502. In this example, the right side touch-sensitive surface is divided into four (4) segments. In some embodiments, the sensory-interface device includes a left side touch-sensitive surface 503. In this example, the left side touch-sensitive surface has a single segment.

Figure 6:
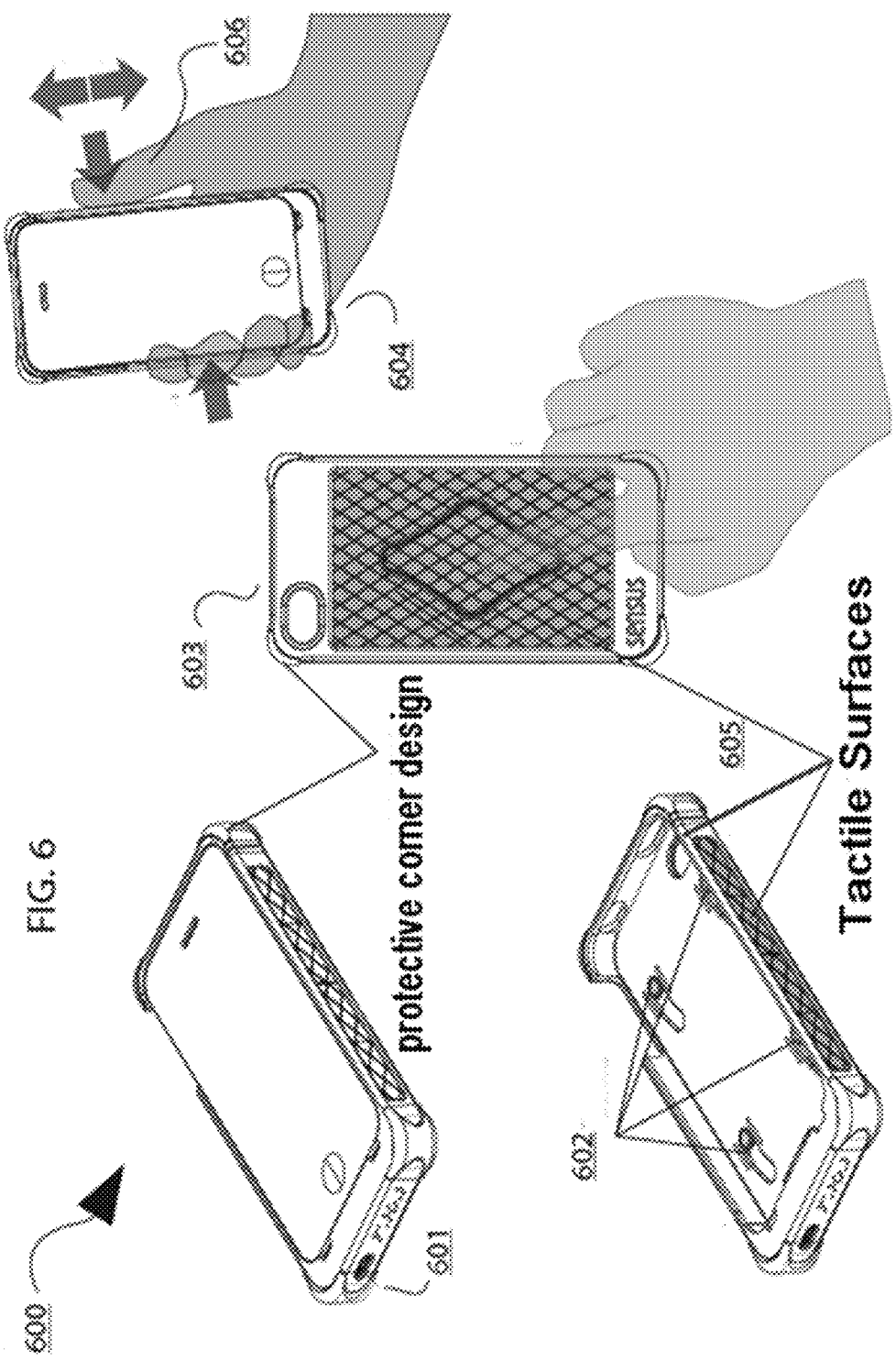
FIG. 6 is a perspective-view illustration of major elements of a sensory-interface device, according to some embodiments of the present invention.

FIG. 6 is an illustration of some of the features in some embodiments of the present invention. In some embodiments, a sensory-interface device includes a USB input 601 for transferring, collecting, or analyzing data shared with another device (e.g., a personal computer or a tablet computer). In some embodiments, a sensory-interface device includes a plurality of slide tracks and grommets 602 which allows the sensory-interface device to be easily attached and removed from an attached mobile device. In some embodiments, a sensory-interface device includes protective rubberized corners 603. In some embodiments, the present invention includes a plurality of touch-sensitive surfaces 605, including a touch-sensitive surface on the back of the sensory-interface device, a touch-sensitive surface on the side of the sensory-interface device, and a touch-sensitive surface along an edge of the sensory-interface device. A given embodiment may include any or all of these sensors as well as additional touch-sensitive surfaces. In some embodiments, the touch-sensitive surface detects both touch and pressure. In some embodiments, a sensory-interface device can recognize an individual based on the individual's grip on the phone 604. In some embodiments, a touch-sensitive surface on the side of the case can be used for scrolling with one's thumb 606.

Figure 7:
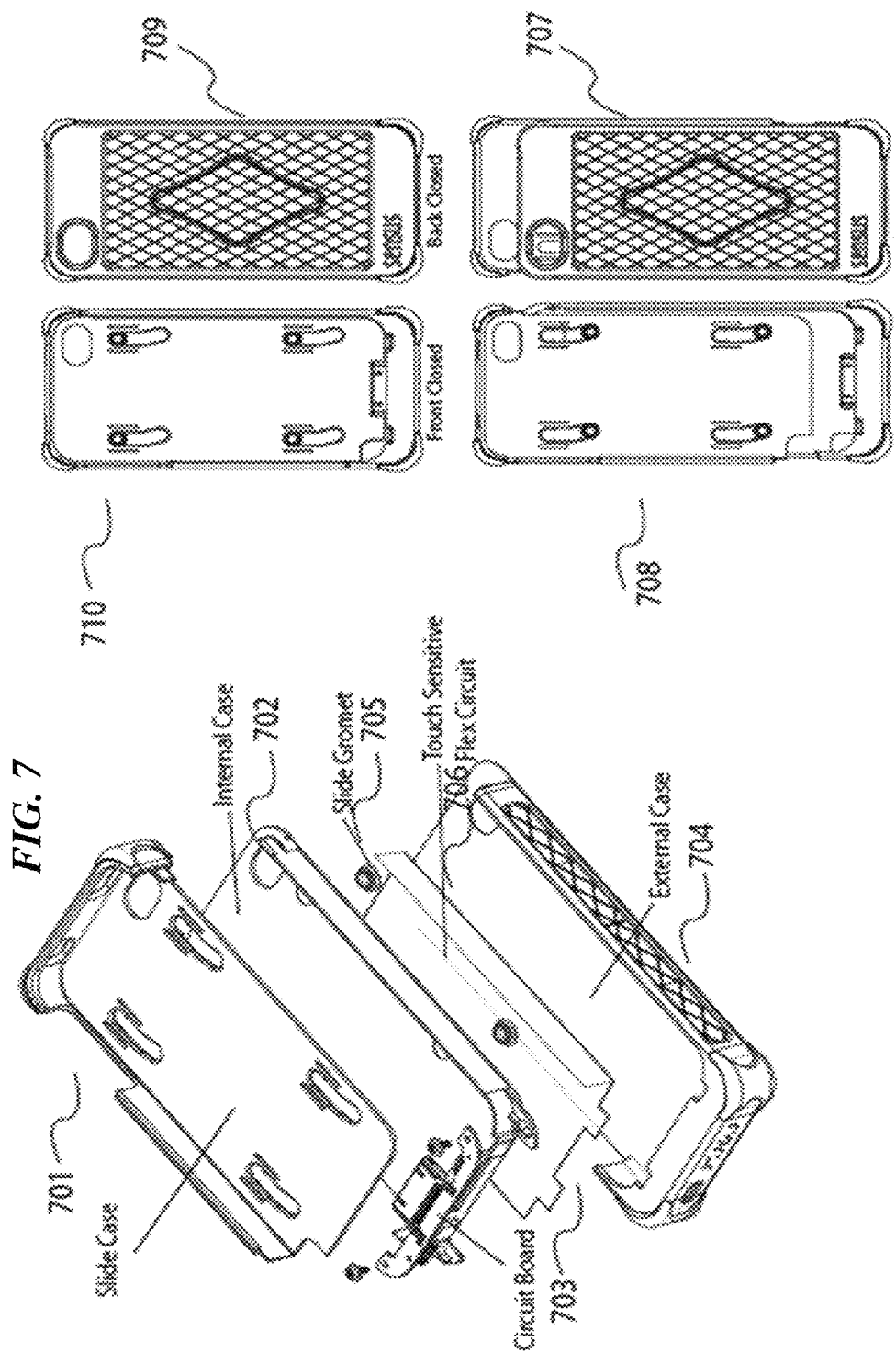
FIG. 7 is an exploded perspective-view diagram of a sensory-interface device, along with front and back views of the device in closed and opened configurations, according to some embodiments of the present invention.

FIG. 7 is an exploded drawing of one embodiment of the present invention. In some embodiments, a sensory-interface device in configured as a case that fits around the back and sides of a mobile device such as a smartphone, and includes a number of components. In some embodiments, these components include a slide portion of the case 701, an internal case 702 which includes a circuit board 703, an external case 704, and a touch sensitive flex circuit 703. In some embodiments, the touch sensitive flex circuit is located between the internal case 702 and the external case 704, and the internal case is fastened to the external case. The slide case 701 is attached to the internal case with slide grommets 705 that allow the slide case to move relative to the internal case. To attach a sensory-interface device to a mobile device, the slide case is pulled to an open position shown in 707 from the back and 708 from the front. A mobile device is placed into the case and the slide case is pushed to the closed position shown in 709 from the back and 710 from the front, secured attaching the sensory-interface device to the mobile device.

Figure 8:
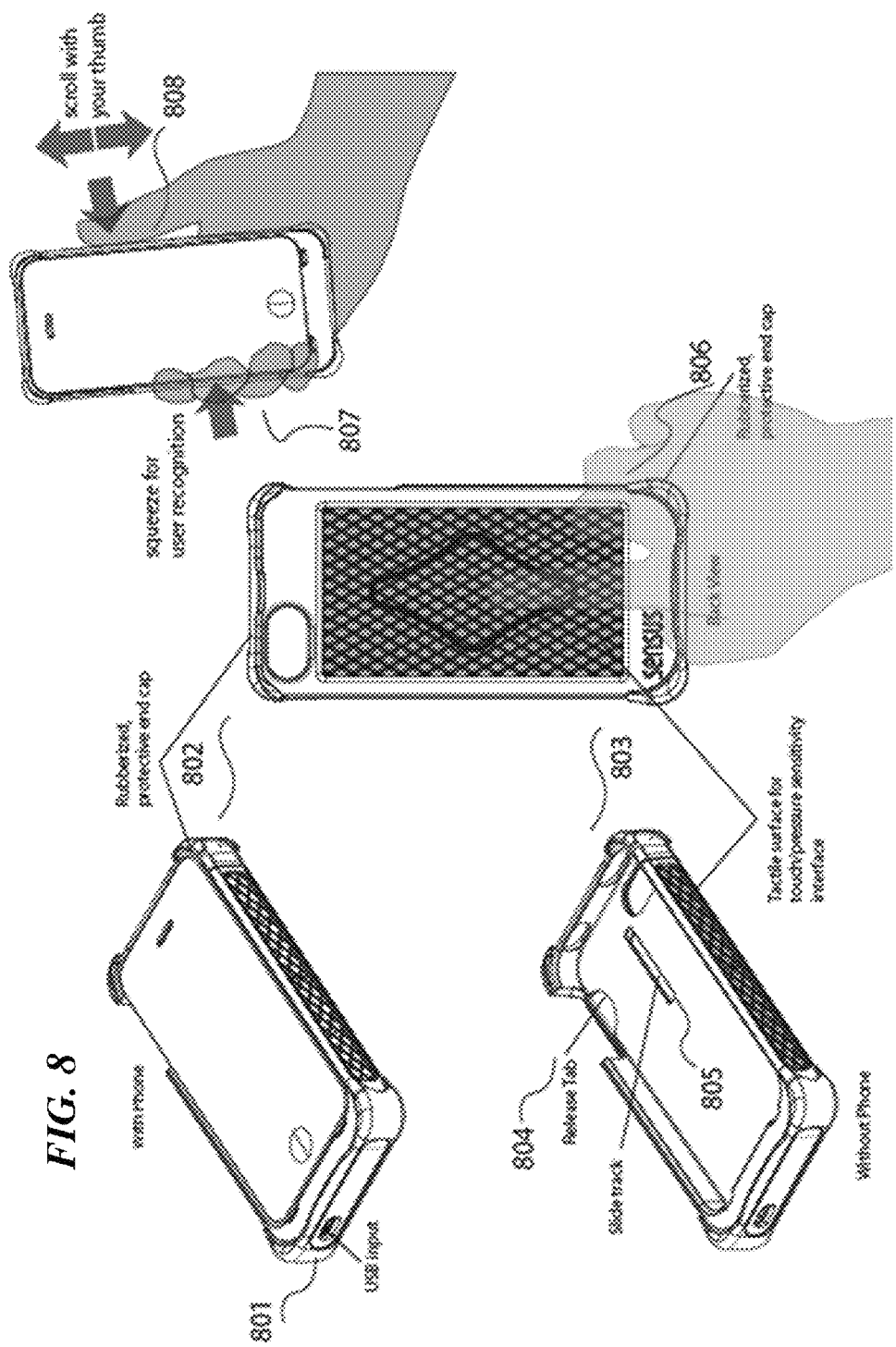
FIG. 8 is a perspective-view illustration of major elements of a sensory-interface device, according to other embodiments of the present invention.

FIG. 8 is an illustration of some of the features in some embodiments of the present invention. In some embodiments, a sensory-interface device includes a USB input 801 for transferring, collecting, or analyzing data shared with another device (e.g., a personal computer or a tablet computer). In some embodiments, a sensory-interface device includes a slide track 805 which allows the sensory-interface device to be easily attached and removed from an attached mobile device. In some embodiments, a sensory-interface device includes protective rubberized end caps 802 and 806. In some embodiments, the sensory-interface device includes a release tab 804 to facilitate the attachment and removal of a sensory-interface device from a mobile device. In some embodiments, the present invention includes a plurality of touch-sensitive surfaces 803, including a touch-sensitive surface on the back of the sensory-interface device, and a touch-sensitive surface on the side of the sensory-interface device. A given embodiment may include any or all of these sensors as well as additional touch-sensitive surfaces. In some embodiments, the touch-sensitive surface detects both touch and pressure. In some embodiments, a sensory-interface device can recognize an individual based on the individual's grip on the phone 807. In some embodiments, a touch-sensitive surface on the side of the case can be used for scrolling with one's thumb 808.

Figure 9:
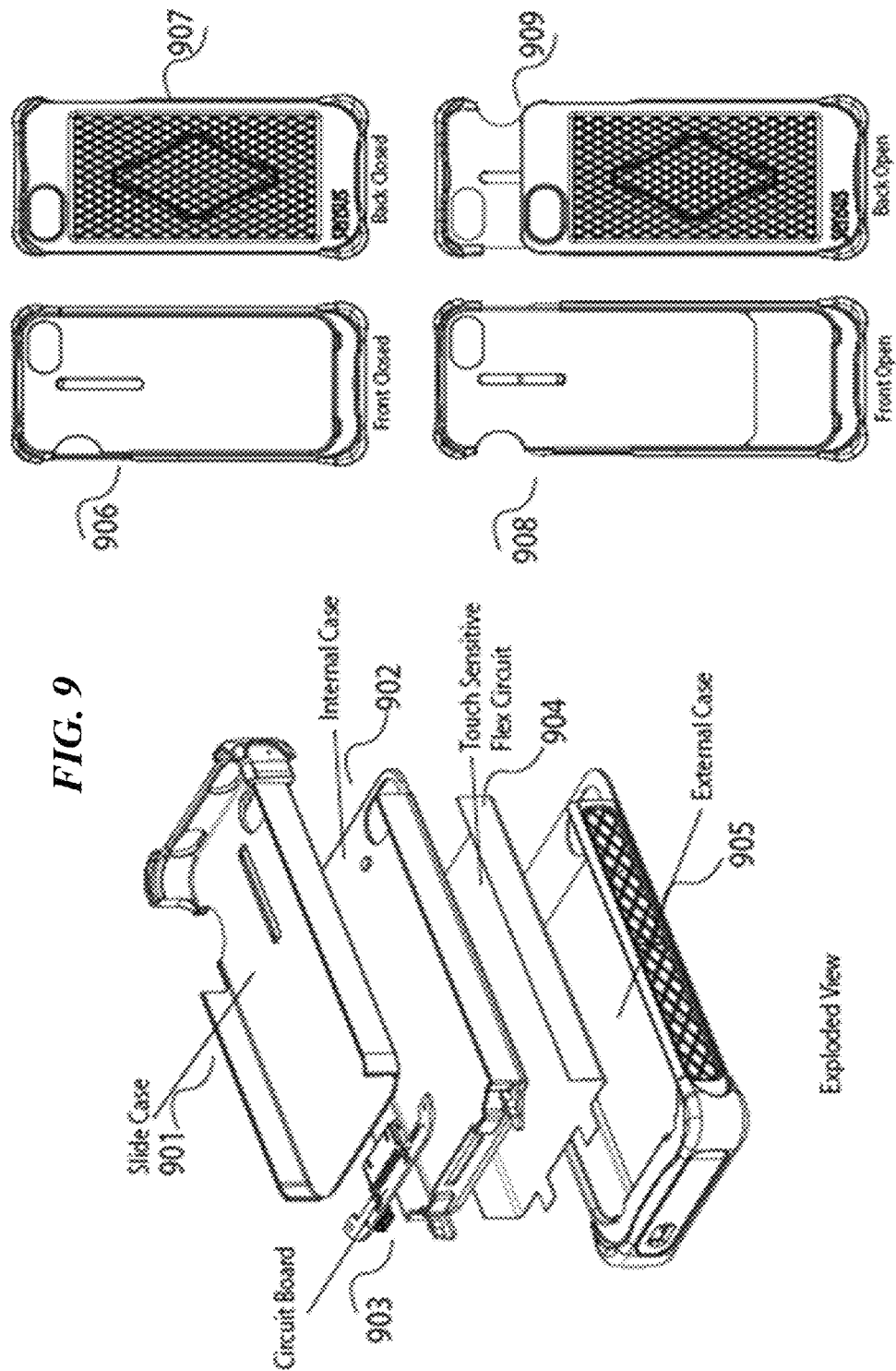
FIG. 9 is a perspective-view exploded diagram of a sensory-interface device, along with front and back views of the device in closed and opened configurations, according to other embodiments of the present invention.

FIG. 9 is an exploded drawing of one embodiment of the present invention. In some embodiments, a sensory-interface device in configured as a case that fits around the back and sides of a mobile device such as a smartphone, and includes a number of components. In some embodiments, these components include a slide portion of the case 901, an internal case 902 which includes a circuit board 903, an external case 905, and a touch sensitive flex circuit 904. In some embodiments, the touch sensitive flex circuit is located between the internal case 902 and the external case 905, and the internal case is fastened to the external case. The slide case 901 is attached to the internal case with a fastener configured to allow the slide case to move relative to the internal case. To attach a sensory-interface device to a mobile device, the slide case is pulled to an open position shown in 909 from the back and 908 from the front. A mobile device is placed into the case and the slide case is pushed to the closed position shown in 907 from the back and 906 from the front, secured attaching the sensory-interface device to the mobile device.

Figure 10:
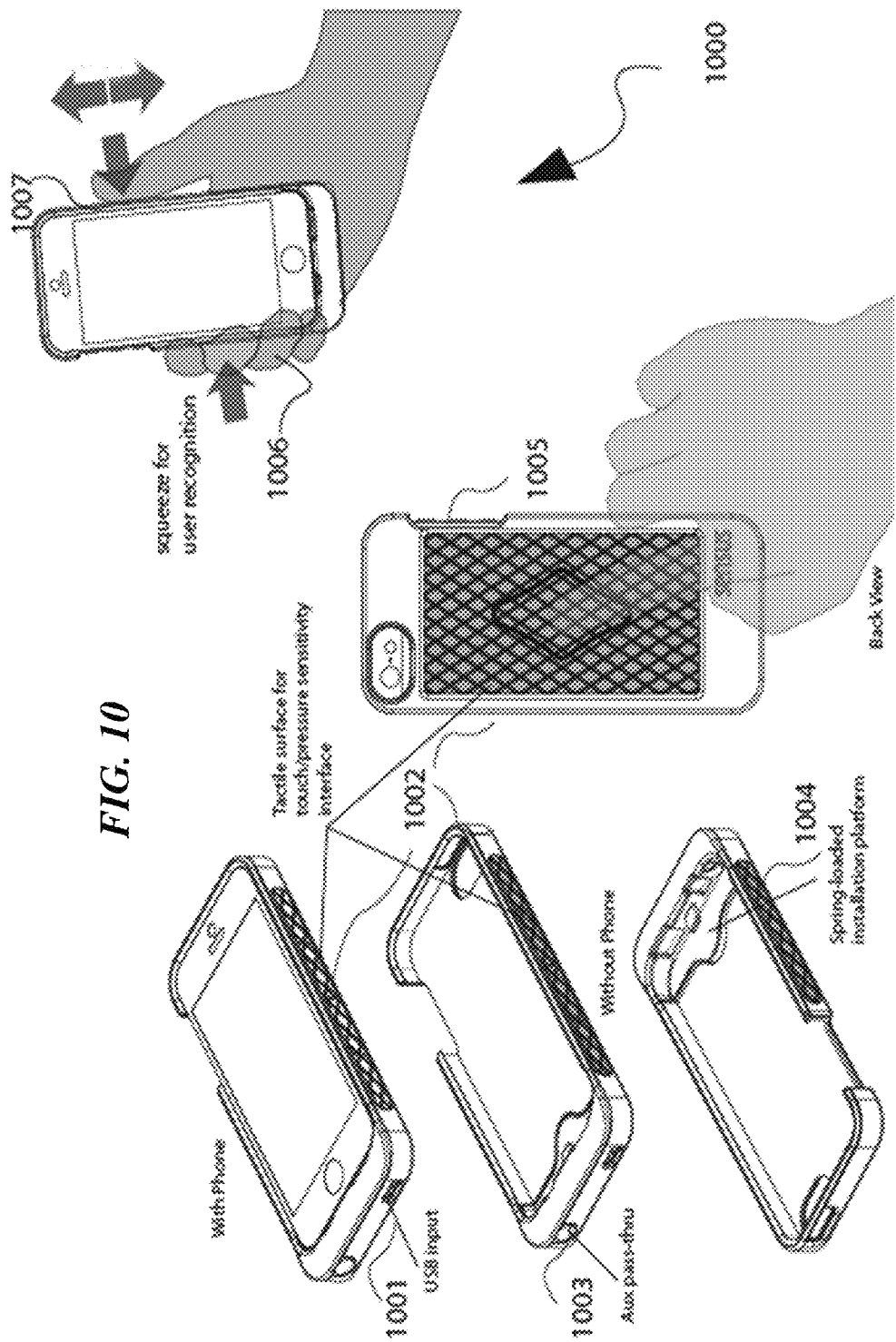
FIG. 10 is a perspective-view illustration of major elements of a sensory-interface device, according to other embodiments of the present invention.

FIG. 10 is an illustration of some of the features in some embodiments of the present invention. In some embodiments, a sensory-interface device includes a USB input 1001 for transferring, collecting, or analyzing data shared with another device (e.g., a personal computer or a tablet computer). In some embodiments, the sensory-interface device includes an opening in the side of the case provides access to the auxiliary connector (e.g., audio jack) of an attached mobile device. In some embodiments, a sensory-interface device includes spring-loaded installation platform 1004 that serves to secure a mobile device in the case, but which allows the sensory-interface device to be easily attached and removed from an attached mobile device. In some embodiments, the present invention includes a plurality of touch-sensitive surfaces 1002, including a touch-sensitive surface on the back of the sensory-interface device, and a touch-sensitive surface on the side of the sensory-interface device. A given embodiment may include any or all of these sensors as well as additional touch-sensitive surfaces. In some embodiments, the touch-sensitive surface detects both touch and pressure. In some embodiments, a sensory-interface device can recognize an individual based on the individual's grip on the phone 1006. In some embodiments, a touch-sensitive surface on the side of the case can be used for scrolling with one's thumb 1007. 1005 is a back view of a sensory-interface device attached to a mobile device.

Figure 11:
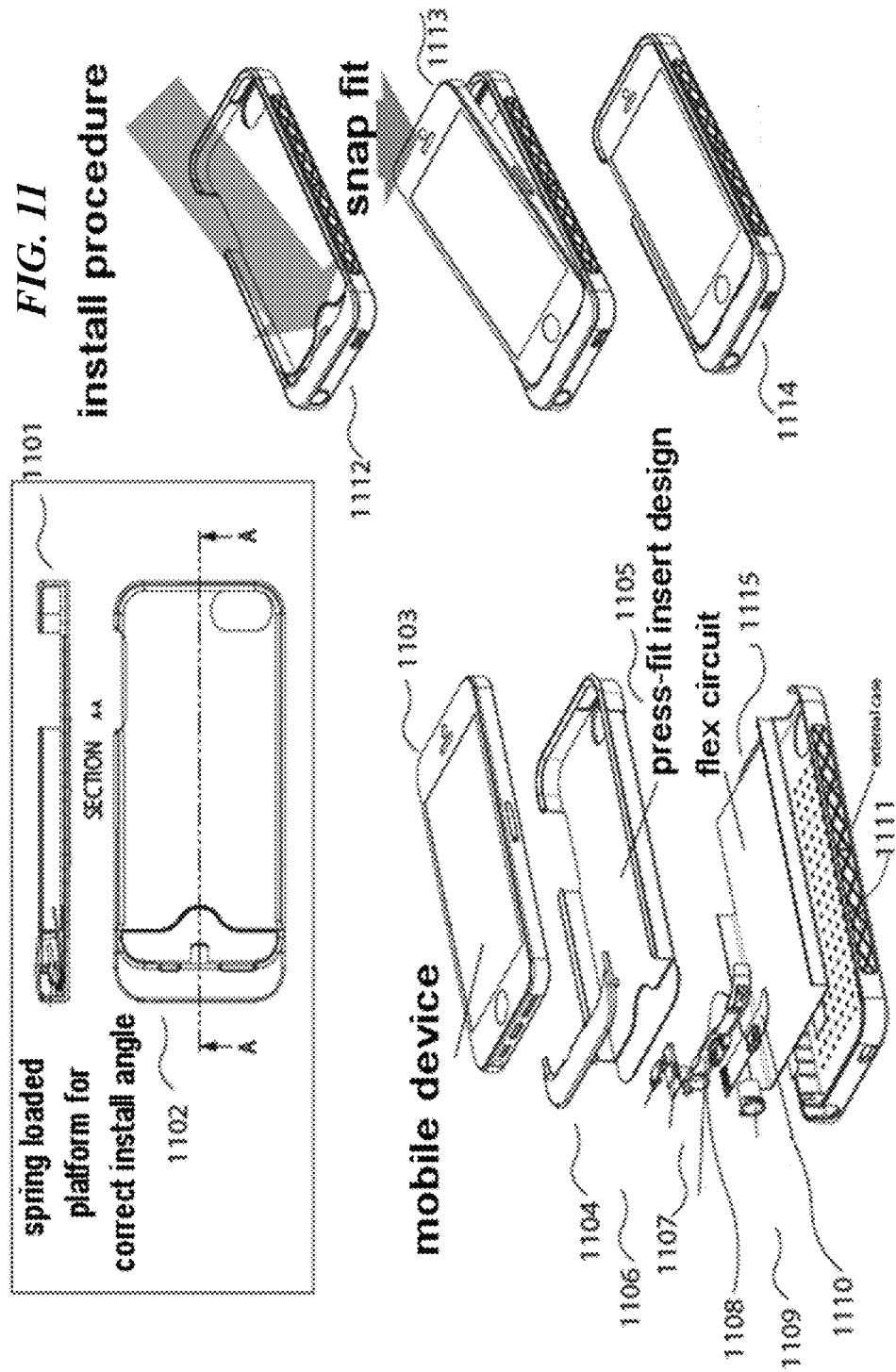
FIG. 11 an exploded perspective-view diagram of a sensory-interface device, according to other embodiments of the present invention.

FIG. 11 is a more detailed view of individual components and the installation procedure of the embodiment shown in FIG. 10. 1102 is a top view of a spring-loaded, press-fit sensory-interface device which uses a spring-loaded platform to secure a mobile device into the device, and 1102 is a cross sectional view through along line AA. In some embodiments, the sensory-interface device includes a press fit insert 1104 and a base cavity cover 1104 that surround the back much of the sides of a mobile device 1103 that can be inserted into the sensory-interface device, a USB connector 106 and connector bracket 1107, a spring-loaded platform 1108 that supplies pressure on an inserted mobile device to securely hold it in place, an auxiliary jack insert 109 to permit a connection to the mobile device's auxiliary (audio) jack, a printed-circuit board (PCB) containing the electronic components of the sensory-interface device, a touch-sensitive flex circuit 115, and an external case 1111. In some embodiments, the functional elements provided by the electronic components on the PCB include a microprocessor, program and data storage for software running on the microprocessor, touch-sensitive surface control electronics, secure storage for storing encrypted data, and data encryption/decryption logic. Not all embodiments include all of these functional elements; some embodiments may include additional functional elements. In some embodiments, a mobile device is installed into a sensory-interface device as follows: a mobile device is placed in a sensory-interface device at an angle 1121 such that it aligns with the spring-loaded platform; the mobile device is pushed toward the bottom and back of the sensory-interface device 1113 until the mobile device is within the sensory-interface device and is securely held in place 1114.

Figure 12:
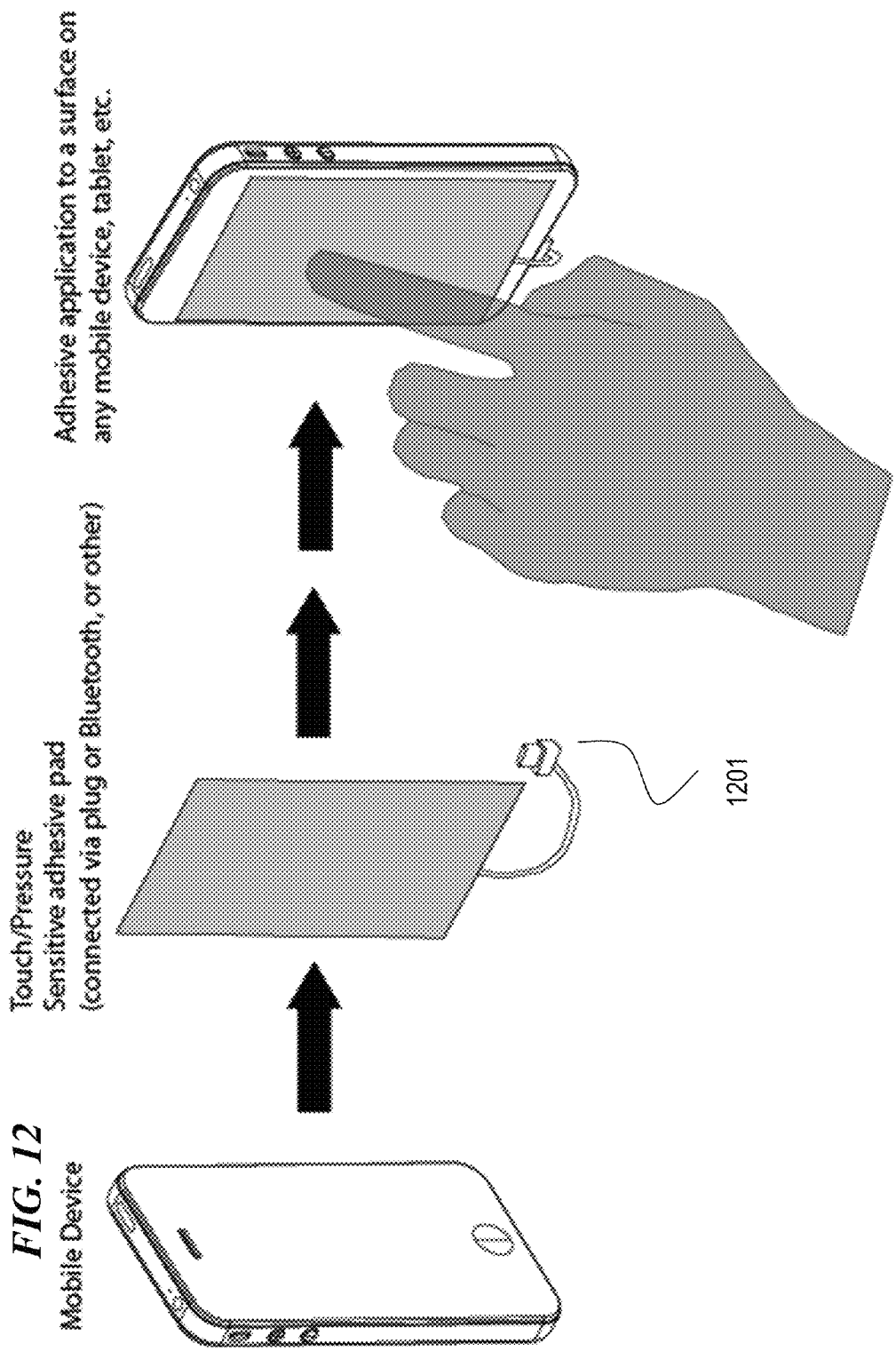
FIG. 12 is a perspective-view illustration of a sensory-interface device which includes a micro-thin, touch and/or pressure sensitive capacitive touch surface adhesively attached to a mobile device, according to some embodiments of the present invention.

FIG. 12 is an illustration of a sensory-interface device in some embodiments of the present invention. In some embodiments, the sensory-interface device is a touch-sensitive surface attached to the back of a mobile device with an adhesive. In some embodiments, the adhesively attached sensory-interface device communicates with the mobile device using a wireless protocol (e.g., Bluetooth® or NFC). In other embodiments, the adhesively attached sensory-interface device communicates with the mobile device using connection (e.g., USB or the proprietary iPhone connector). In some embodiments, software to enable the touch-sensitive surface of the sensory-interface device is downloaded, resides and runs on the mobile device. In other embodiments, the touch-sensitive surface of the sensory-interface device includes a microprocessor and storage that contain and run the software to enable the touch-sensitive surface. In some embodiments, the sensory-interface device is pre-programmed, and a connector plug (e.g., the USB connector used to connect the sensory-interface device to the mobile device) includes a microprocessor and storage that contain and run the software to enable the touch-sensitive surface. In some embodiments, the touch-sensitive surface is a micro-thin, capacitive-touch, touch and/or pressure sensitive device.

Figure 13:
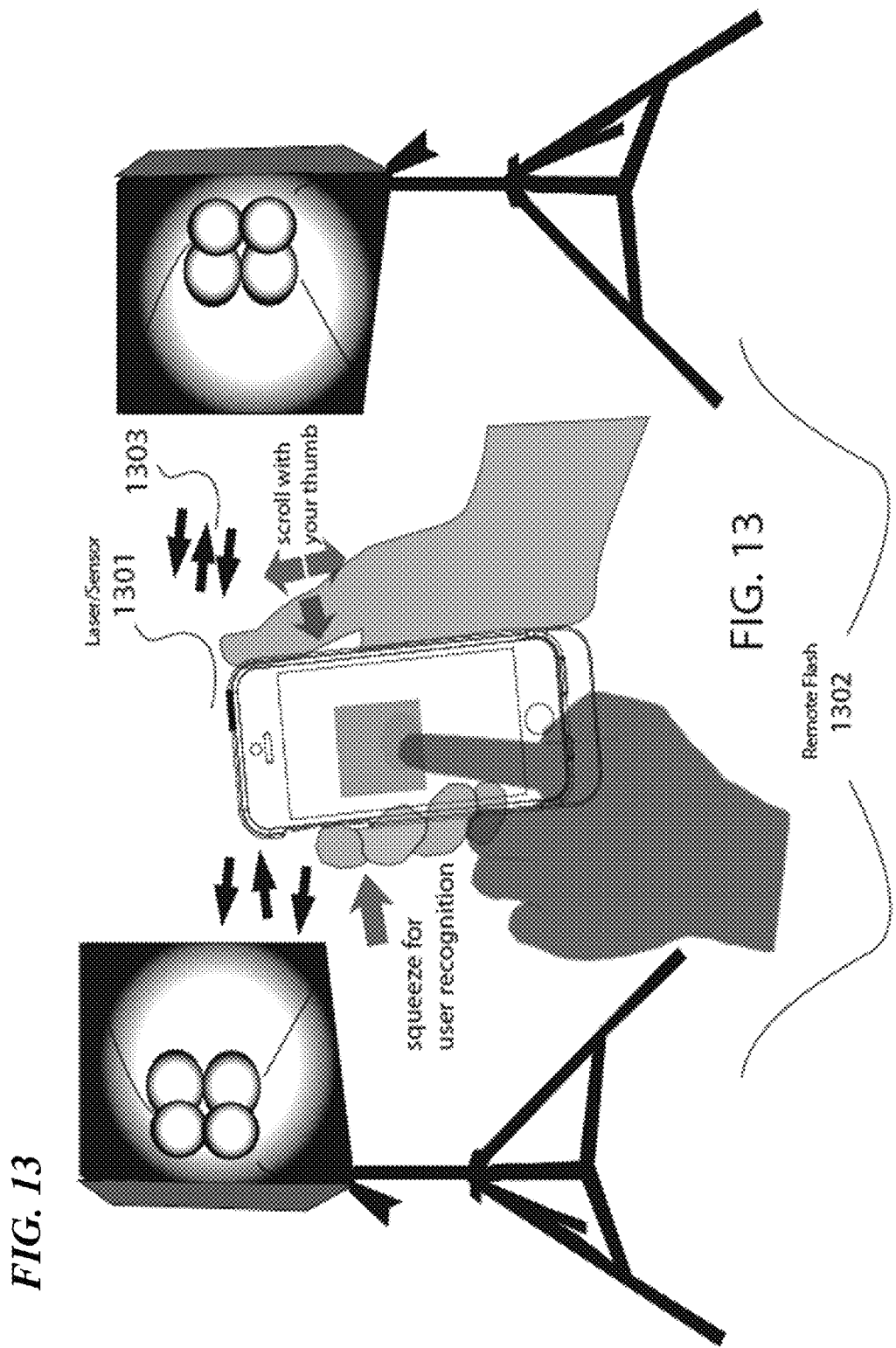
FIG. 13 is a perspective-view illustration of a sensory-interface device interacting with remote flash units for photography, according to some embodiments of the present invention.

FIG. 13 is an illustration that represents the functionality of a sensory-interface device in some embodiments. In some embodiments, the sensory-interface device includes a laser (e.g., a visible light or infrared LED laser) and a light-sensing device (e.g., a photodiode or a photo transistor) 1301. In some embodiments, the laser/light sensor combination is used to interact with external electronic devices. One example of such interaction is the use remote flash lighting units 1302 for photography with an attached mobile device's camera. Taking a picture with attached mobile device's camera causes a light signal 1303 to be emitted from the laser that triggers the remote flash units. The light sensor detects the mount of light coming from the remote flash units and turns them off when the desired amount of light has been emitted from the remote flash units. Software running on the mobile device can analyze the captured image and determine if a different amount of light should be emitted by the remote flash units for a subsequent image. In some embodiments, the laser/light sensor combination is used as a range-finder to measure distance by emitting a light pulse from the laser, allowing it to reflect (i.e., bounce) off of a surface, detecting the return of the reflect light pulse, measuring the time it took for the light pulse to travel from the sensory-interface device to the surface and back, thereby determining the distance to the surface. In some embodiments, such a distance measuring capability is combined with an application running on the attached mobile device that would allow a contractor, for example, to measure the dimensions of a room, and based on cost information input by the contractor, automatically generate a bid and wirelessly sent it to a client.

In some embodiments, the sensory-interface device includes biomedical sensors that detect functions of a human body such as pulse rate, respiration rate, and an electrocardiogram (EKG). In other embodiments, the sensory-interface device includes a sensor to measure blood sugar levels for a blood-sugar diabetic test. In other embodiments, the sensory-interface device elicits and receives information from a remote drone, including sending flight control information to the drone and receiving images and/or other telemetry from the drone. This function could include military uses.

Figure 14:
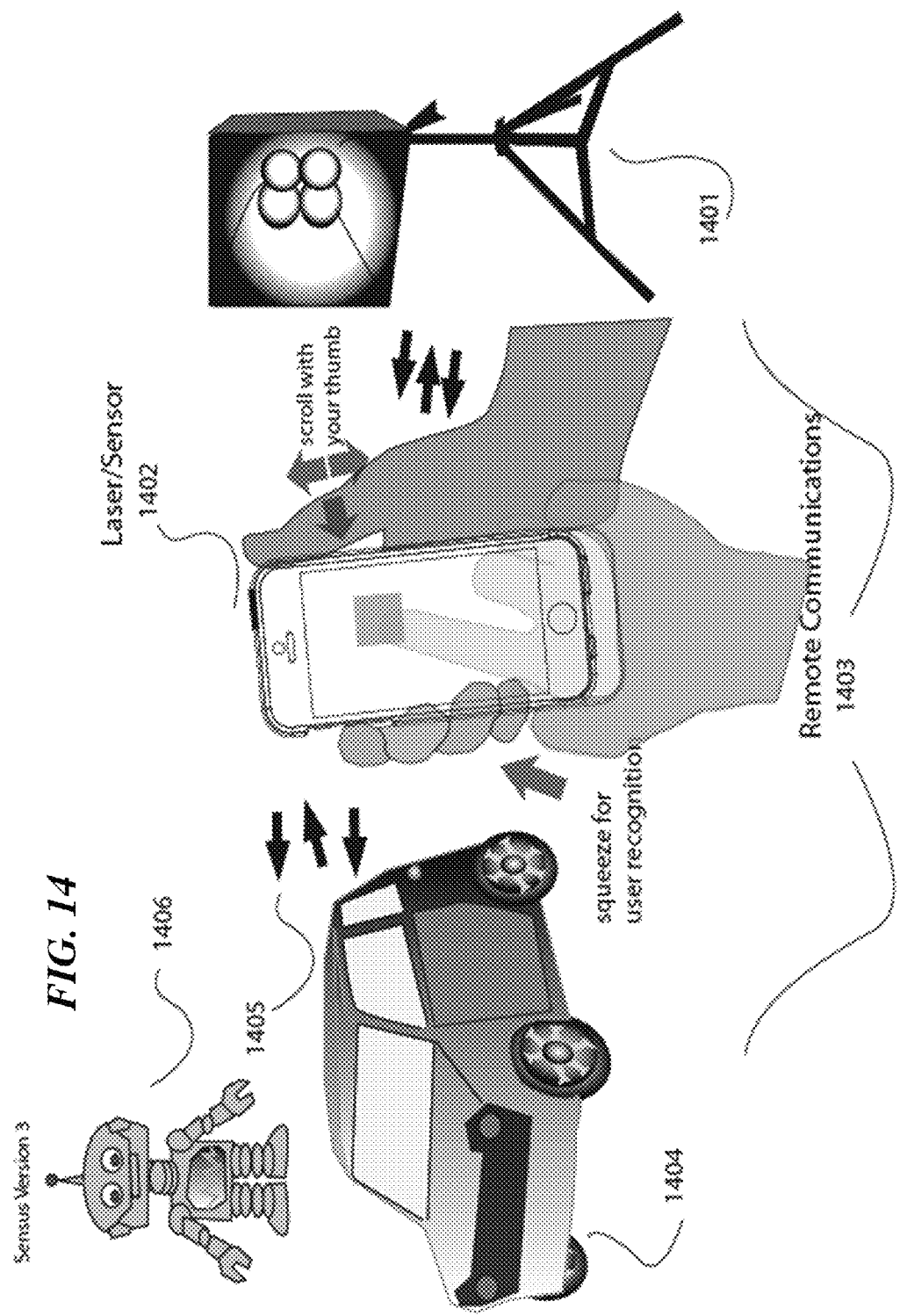
FIG. 14 is a perspective-view illustration of a sensory-interface device interacting with a variety of remote electronic devices, according to other embodiments of the present invention.

FIG. 14 is an illustration that represents the functionality of a sensory-interface device in some embodiments. A sensory-interface device can interact with a wide variety of other electronic devices 1403, sending data to and receiving data from such devices 1405. In some embodiments, such devices include a remote flash for photography 1401, a vehicle 1404, and a robotic device 1406. In some embodiments, the communications with external devices is done using a wireless radio-frequency communication protocol (e.g., Bluetooth®, NFC, or Wi-Fi). In other embodiments, the communications with external devices is done using a wireless light-based communication protocol employing a laser and light sensor 1402 (described above as 1301 in FIG. 13).

In the present description of present invention, the term "sensors" includes sensors that include electronics and that output electronic signals that represent one or more parameters sensed by the sensor, as well as sensors that do not themselves include electronics, and that output optical signals or the like. As used herein, "sensors" are devices that detect and/or interpret parameters that are caused or controlled by a human user, as well as parameters of the environment, such as pressure (e.g., the touch or pressure from one or more fingers on a touch screen), acceleration (such as from gravity, tilting of the device, or shaking of the device), light (such as brightness, color, time-of-flight of a laser pulse), chemical detection and concentration determination (such as sensors for smoke, carbon monoxide, chemicals that could be smelled, chemicals that are odorless, chemicals that could be tasted, and/or chemicals that are tasteless, whether in gas or liquid form, or the like), acoustic parameters (including sounds in the range of human hearing as well as pressure vibrations below or above that range, including ultrasound sensors that are used, e.g., to detect a time-of-flight of a sound pulse for the purpose of determining a distance or making an ultrasound image), taste, temperature, pressure, moisture and/or other physical properties of the environment as a whole.

FIG. 15A is a perspective drawing of the back (reverse) side of a system 1500 that includes a device protective enclosure 1501 that surrounds at least some of the outer edges and/or front and back of mobile computing device 1590, and which has a through-hole aperture 1510 in a back-side touch-sensitive input surface 1509 of protective enclosure 1501 to provide access to back-side touch panel 1591 on mobile computing device 1590. In some embodiments, aperture 1510 is surrounded by one or more edge surface areas 1502, 1503, 1504, and/or 1505 that provide space for one or more additional sensory components for receiving user input, and/or input and/or output devices that enhance the functionality of mobile computing device 1590. In some embodiments, a resilient material is affixed to the corners of protective enclosure 1501 to form bumpers 1506 (sometimes referred to herein as "crashbumpers") that protect mobile computing device 1590, for example if system 1500 is dropped onto a hard surface. In some embodiments, protective enclosure 1501 includes one or more apertures 1508 to provide outside access for components, such as camera and flash 1592, of the mobile computing device 1590.

In some embodiments, back surface 1509 of the protective enclosure 1501 extends from the outer circumference of protective enclosure 1501 to the outer edges of one or more additional sensor areas 1502, 1503, 1504, and/or 1505. In some embodiments, protective enclosure 1501 includes one or more sensory component, such as a touch-sensitive sensor, in or on back surface 1509 (in some embodiments, the touch-sensitive sensor in back surface 1509 functions as an additional touch sensor for mobile computing device 1590. In some embodiments, protective enclosure 1501 includes one or more sensory component, such as a touch-sensitive sensor, in or on side surfaces 1519 and/or end surfaces 1529 that also or alternatively function as additional touch sensors for mobile computing device 1590 (for example, such side-surface sensors 1519 function as programmable volume controls for audio output, as camera-activation inputs to activate the electronic "shutter" to take a photograph or start a video recording, or the like). In some embodiments, the additional aperture-edge sensor areas 1502, 1503, 1504, and 1505 provide further touch-sensitive "real estate" available to the enhanced user interface of the present invention (e.g., in some embodiments, additional sensor areas 1502, 1503, 1504, and 1505 provide additional surface opportunities to receive user input data). In some embodiments, additional sensor areas 1502, 1503, 1504, and 1505 are beveled inner edges of a through opening 1510. In some embodiments, the mobile computing device 1590 includes a touch-sensitive user-input surface built into the back-side surface of mobile computing device 1590, that, for example, permits the user to control items such as cursors, game pieces or figures, or other things displayed on the front-side display screen of mobile computing device 1590. Thus, in some embodiments, the aperture of through opening 1510 provides touch-access for the human user to the rear surface of mobile computing device 1590. In some embodiments, the one or more additional sensor areas 1502, 1503, 1504, and/or 1505 each includes a touch-sensitive area within a beveled-surface space that occupies an area between the back surface of mobile computing device 1590, and the back outer surface 1509 of the external protective device 1501. In some embodiments, one or more of the additional sensor areas 1502, 1503, 1504, and/or 1505 provides additional surface area to accommodate other types of sensory inputs or other kinds of input and/or output components, such as light emitters (e.g., LEDs that can be strobed), vibration devices that provide a touch-feedback to a user, light emitter-detector combinations that are used to determine oxygen content in the user's blood by directing light output towards the user's fingers and detecting amounts and wavelengths of the returned light, or any other suitable input and/or output component.

Thus, in some embodiments, one or more of the additional aperture-edge sensor areas 1502, 1503, 1504, and/or 1505 are implemented to include touch sensors or other input and/or output devices for user interaction with mobile computing device 1590.

In some embodiments, external sensory inputs (i.e., sensors) on a protective housing are located between the back of the housing 1509, and the back surface of the mobile device 1510. In some embodiments, user-programmable inputs sensors are implemented in sensor areas 1502, 1503, 1504 and/or 1505, and are programmed by the user of the mobile device 1510, or a remote user using a separate device 2302 (see the description of FIG. 23 below). In some embodiments the user provides the gesture-control programming that enables the sensors to control the software application that is executing on the mobile device 1590 according to user preferences.

FIG. 15B is an end cross-sectional drawing of the protective enclosure 1501 shown in FIG. 15A as seen at section line 15B of FIG. 15A. The cross section of mobile computing device 1590 is not shown here, in order to more clearly show pocket 1511 that is configured to receive and securely retain mobile computing device 1590 and provide a level of protection against scuffs to the surface or damage from dropping system 1500 (which includes both mobile computing device 1590 and protective enclosure 1501 as shown in FIG. 15A). In some embodiments, protective enclosure 1501 includes a replaceable thin protective film 1515 stretched across aperture 1510 and adhesively attached to the inner back surface 1516 of the protective enclosure 1501. Replaceable thin protective film 1515 is configured to not impair the sensing functionality of the back touch-surface of mobile computing device 1590. Other embodiments omit this film 1515.

FIG. 15C is a side cross-sectional drawing of the device protective enclosure 1501 shown in FIG. 15A as seen at section line 15C of FIG. 15A.

Figure 15D:
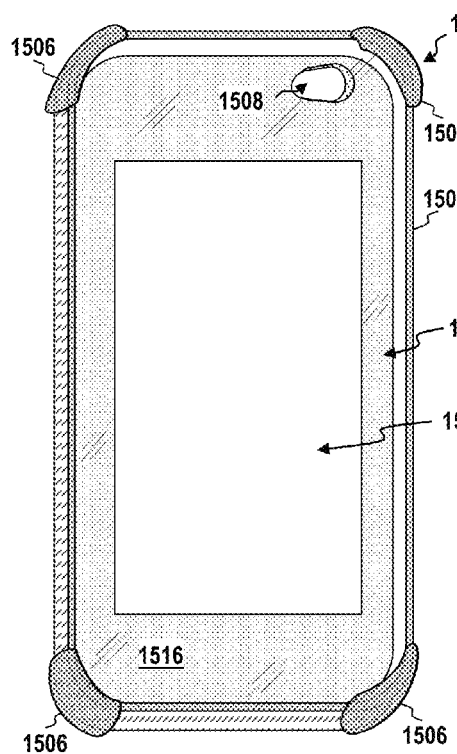
FIG. 15D is a perspective drawing of the front (obverse) side of a device protective enclosure 1501, according to some embodiments of the present invention.

FIG. 15D is a perspective drawing of the front (obverse) side of a device protective enclosure 1501, according to some embodiments of the present invention.

Figure 16A:
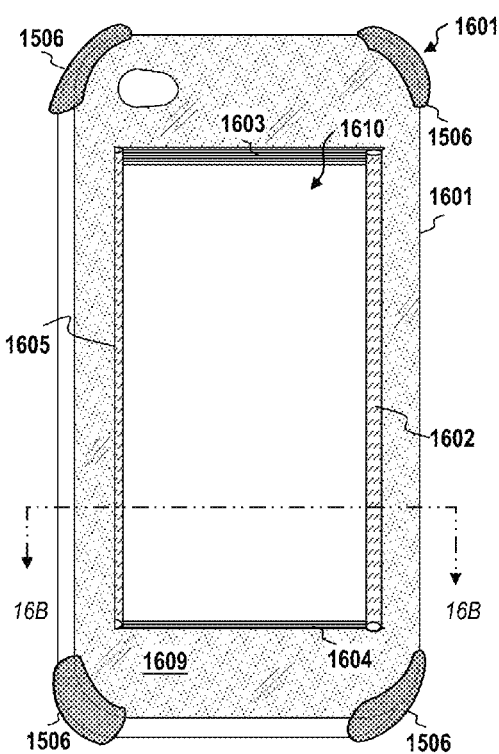
FIG. 16A is a perspective drawing of the back (reverse) side of a device protective enclosure 1601 having protective properties for mobile computing device (such as device 1590 shown in FIG. 15A and FIG. 15B), and which has one or more sensory components such as those indicated by reference numbers 1602, 1603 and 1604 on the external protective device 1601, according to some embodiments of the present invention.

FIG. 16A is a perspective drawing of the back (reverse) side of a device protective enclosure 1601 having protective properties for mobile computing device (such as device 1590 shown in FIG. 15A and FIG. 15B), and which has one or more sensory components such as those indicated by reference numbers 1602, 1603, 1604 and 1605 on the external protective device 1601, according to some embodiments of the present invention. In some embodiments, one or more of the sensory components 1602, 1603, 1604 and 1605 includes a physical "hyperroller" that has an elongated rod. optionally having tiny ridges, bumps or other surface texture, and held by low-friction bearings at the ends, and which the user rolls around its longitudinal axis by finger wiping action. In some embodiments each physical hyperroller includes a thin roller having a length of five (5) to twenty (20) cm and a diameter of 0.7 to 2 mm, is held by sleeve or roller bearings such that it can be rolled by a user rubbing or wiping their finger(s) over it. In some other embodiments, a substantially similar user interface is implemented as a virtual hyperroller, defined as a touch-sensitive surface area configured to detect finger movement across its short dimension (i.e., with the user's finger wiping or rubbing in a direction perpendicular to the long axis) in a motion that mimics a physical roller by detecting the user rubbing or wiping their finger(s) over its short dimension to, e.g., rapidly scroll through a virtual document from one side to another.

Figure 16B:
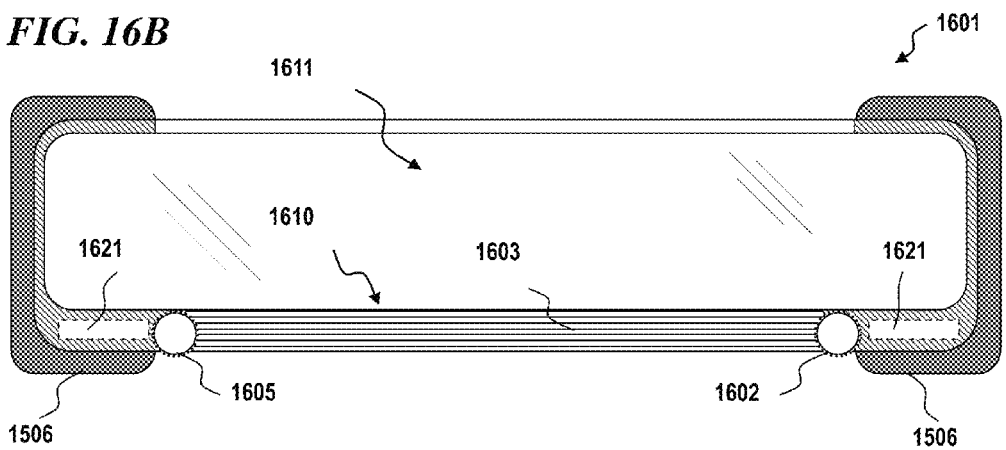
FIG. 16B is an end cross-sectional drawing of the device protective enclosure 1601 shown in FIG. 16A as seen at section line 16B of FIG. 16A.

FIG. 16B is an enlarged cross-sectional end view (not to the same scale as FIG. 16A) of the device protective enclosure 1601 shown in FIG. 16A, as seen at section line 16B of FIG. 16A. As shown, some embodiments of protective enclosure 1601 include embedded devices 1621 that include electronics, sensor devices, battery electrical storage, radio antennae, and/or other like devices that implement the enhanced functionality of protective enclosure 1601. In some embodiments, protective enclosure 1601 includes electrical contacts that are used to connect power and/or electrical signals to optional and-in devices as described further below.

Figure 17:
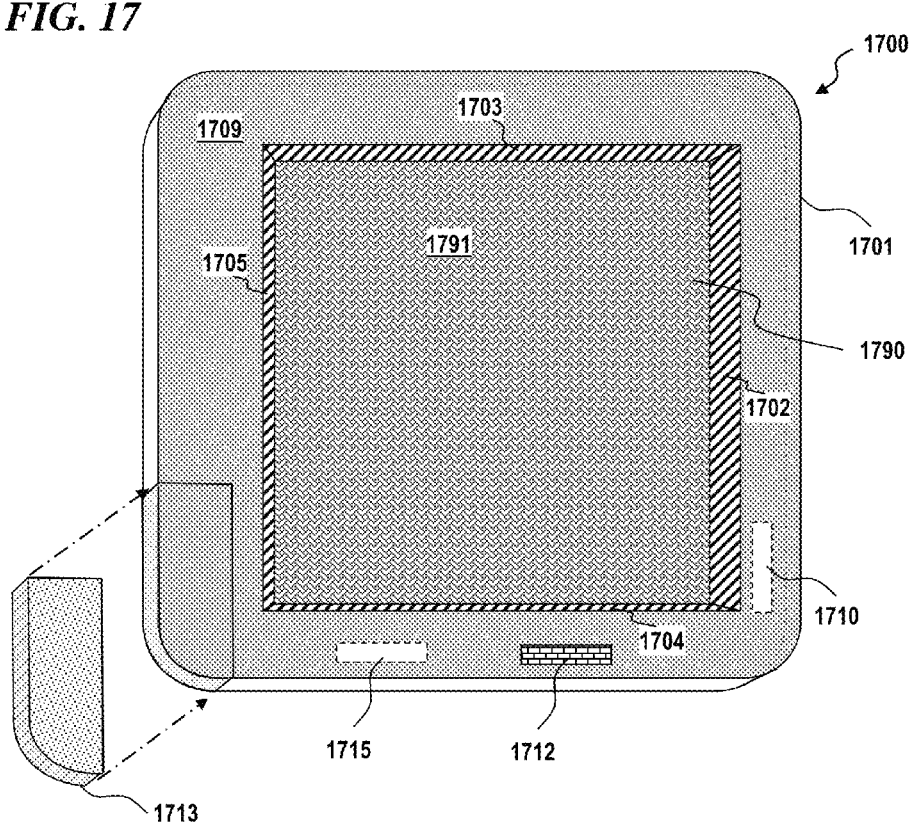
FIG. 17 is a perspective drawing of the back (reverse) side of a system 1700 that includes device protective enclosure 1701 and a mobile tablet or other wireless communications and/or computing device 1790 according to some embodiments of the present invention, wherein the external protective enclosure 1701 contains, in some embodiments contains user parameters that are specified by a user, or user group, wherein the user parameters are stored in one or more onboard components such as those indicated by reference numbers 1710, 1712, and 1715, and optionally in one or more external add-on components such as those indicated by reference number 1713.

FIG. 17 is a perspective drawing of the back (reverse) side of a system 1700 that includes a device protective enclosure 1701 that holds a mobile computing device such as a tablet computer 1790, optionally having one or more local and/or long-distance wireless communications capabilities (such as an Apple® iPad®, with wifi, Bluetooth®, and/or telephony communications). In some embodiments, external protective enclosure 1701 contains user parameters that are specified by a user or user group, wherein the user parameters are stored in one or more onboard components such as those indicated by reference numbers 1710 (e.g., a microprocessor), 1712 (e.g., a battery), and 1715 (e.g., an antenna), and optionally one or more external add-on and/or plug-in components 1713. Having plug-in optional components 1713 allows a common platform 1701 to be customized with specialized functions that will differ from user to user depending on their personal requirements or desires. Some embodiments (not shown here) include resilient bumpers 1506 such as shown in FIGS. 15A-15D. In some embodiments, one or more additional sensor areas 1702, 1703, 1704, and/or 1705 are used for additional sensor inputs and/or output functions, in a manner similar to the one or more additional sensor areas 1502, 1503, 1504, and/or 1505 described for FIG. 15A above.

In some embodiments, protective housing 1701 for a mobile device, designed for access to sensors embedded in the mobile device, that includes sensor input components on an external housing; wherein the back 1791 of the mobile device 1790 is accessible by the user (e.g., to accomplish gesture control input to touch surface 1791. In some embodiments, the protective housing contains a power source 1702 that is separate from the power source (not shown) of the mobile device 1790 (i.e., the device that is protected by the protective housing). In some embodiments, the protective housing 1701 includes a separate data processor 1705 located in the protective housing 1701, separate from the processor(s) in the mobile device 1790. In some embodiments, the protective housing 1701 includes separate data storage 1710 located in the protective housing 1701, separate from data storage within the mobile device 1790. In some embodiments, the protective housing 1701 includes a software program stored in data storage device 1710 that includes software routines to tune and/or optimize the sensory-component data received from the sensory components (e.g., back-surface touch sensor 1709 and/or sensors in aperture edge areas 1702, 1703, 1704, and/or 1705. In some embodiments, the protective housing 1701 includes a software program used to tune and/or optimize sensory component data sent to or received from the sensory components. In some embodiments, the protective housing 1701 contains a software program to tune the sensory component data, optimizing the data elicited from the sensory components from users. In some embodiments, the protective housing 1701 contains a software program to elicit, store, and provide and ready access to, user-defined content.

In some embodiments, the user parameters control the definition and rules of the input and output data from the sensory components. In some embodiments, an add-on sensor housing 1713 includes one or more programmable external sensor components (such as blood-oxygen sensors, temperature sensors, GPS devices, or any other specialized or programmable general purpose input and/or output (I/O) device. In some embodiments this add-on sensor housing 1713 clips on to the external protective enclosure 1701. In some embodiments this add-on sensor housing 1713 is of a standard shape that is interchangeable with other similar add-on sensor housings having different functionality, or with a "dummy" spacer that fills the compartment when none of the interchangeable external sensor housings are connected. In some embodiments, an integrated controller is embedded into the housing of the protective enclosure.

Figure 18:
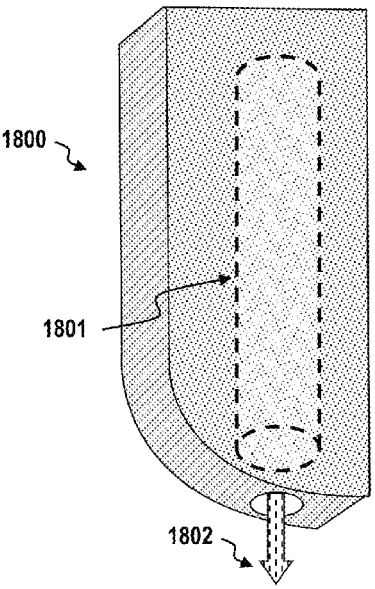
FIG. 18 is an illustration of one embodiment wherein the add-on external housing 1800 contains a data-input and/or data-output device 1801.

FIG. 18 is an illustration of one embodiment wherein the add-on external housing 1800 contains a data-input and/or data-output device 1801. In some embodiments this is a laser measuring device that outputs a laser beam 1802 and detects a return beam (e.g., such as are used in blood-oxygen measurement devices or laser range finders). In other embodiments, I/O device includes an ultrasound transmitter/receiver that emits an ultrasonic pulse and detects an ultrasound response for acoustic range finding. In still other embodiments, other types of combined I/O devices are implemented.

In some embodiments, the swappable clip-on sensors 1801 include devices that elicit and receive data (e.g., such as a speaker and microphone). In some embodiments the clip-on sensors 1900 (described below with regard to FIG. 19) include devices that communicate with distal communication devices and receive and transmit data using antenna 1902 or other suitable wireless communications interface (e.g., radio waves, infrared light, ultrasonic sound or the like; in some embodiments, bi-directionally, while in other embodiments, uni-directionally transmitting or receiving)). In some embodiments the separate clip-on sensors 2100 (described below with regard to FIG. 21) include devices that elicit, receive and transmit data and contain a separate power source 2104 (such as a battery or the like). In some embodiments the external clip-on sensors 2000 (described below with regard to FIG. 20) include devices that have interchangeable components 2001, 2002, and 2003. In some embodiments the clip-on sensors 2100 (described below with regard to FIG. 21) include devices that collect data from sensors that collect a multivariate sensory stack of data.

Figure 19A:
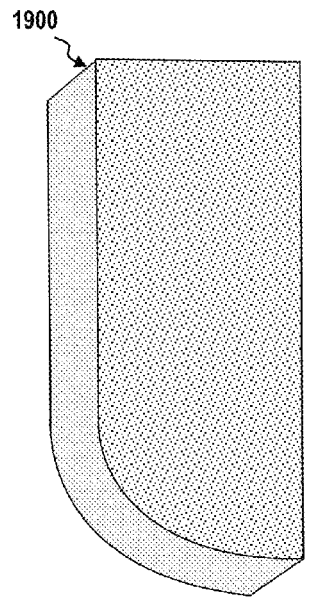
FIG. 19A is a perspective view of an external clip-on sensor component 1900 that contains electronics, according to some embodiments of the present invention.
Figure 19B:
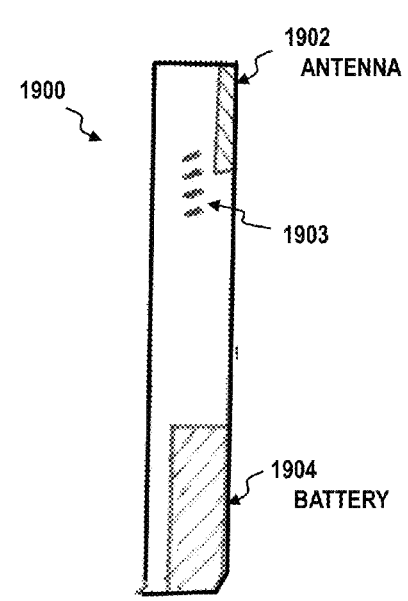
FIG. 19B is a cross-sectional side view of an external clip-on sensor component 1900 that contains electronics, according to some embodiments of the present invention.

FIG. 19A is a perspective view and FIG. 19B is a cross-sectional illustration of external clip-on sensor component 1900, wherein the external clip-on sensor component contains electronics. In some embodiments 1901, an antenna 1902 is included. In some embodiments there are conductive contactors 1903 that provide an electrical path for signals and/or power between the clip-on component 1900 and the protective enclosure device (e.g., enclosure 1701 of FIG. 17 or the like) that provides for a data communications and/or a power gateway. In some embodiments there are other components including a battery 1904.

Figure 20:
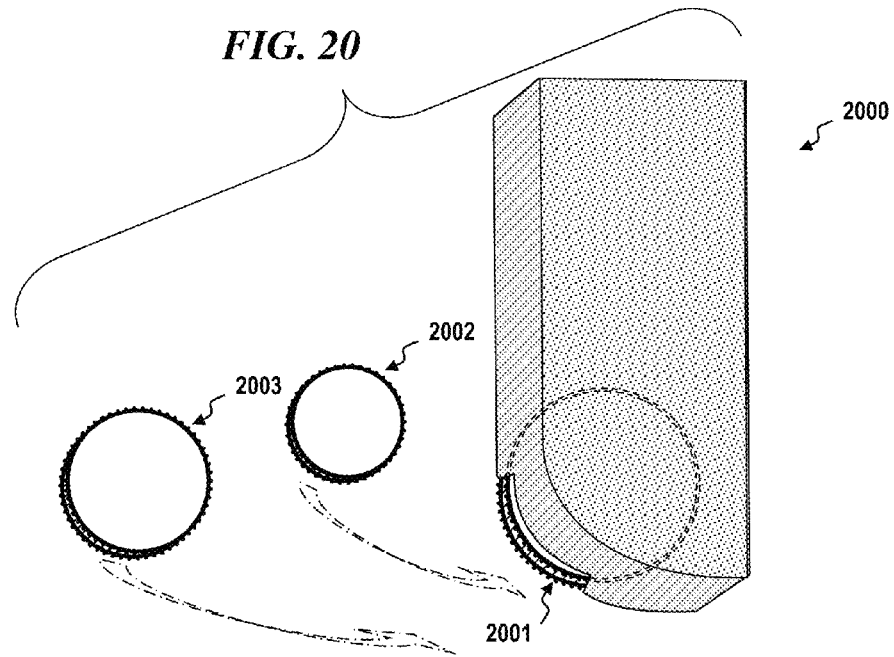
FIG. 20 is a perspective view of an external clip-on sensor component 2000 having a roller-type sensor (e.g., a scroll-wheel input device), according to some embodiments of the present invention.

FIG. 20 is an embodiment 2000 of an external clip-on accessory with a roller-type sensor (e.g., a scroll-wheel input device), according to some embodiments of the present invention. In one embodiment, the scroll wheel portion of sensory component 2001 is interchangeable with different sizes of scroll wheels such as scroll wheel 2002 and scroll wheel 2003.

Figure 21:
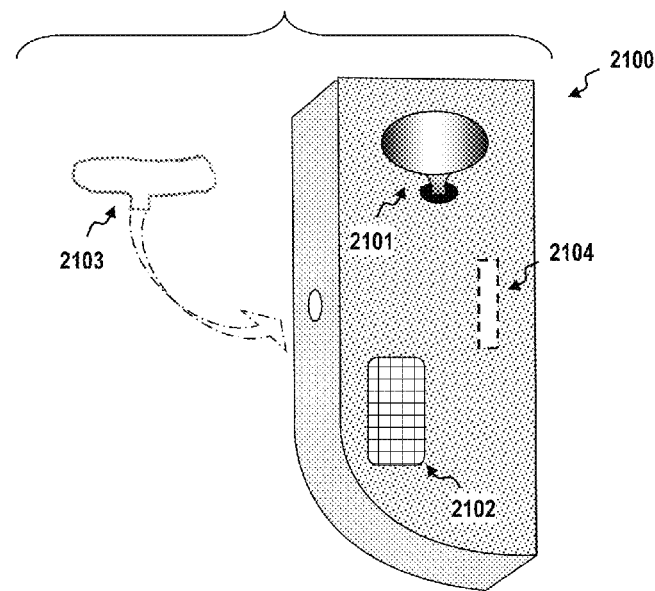
FIG. 21 is a perspective view of an external clip-on sensor housing 2100 wherein the add-on sensor housing 2100 contains an output device 2101 and an input device 2102.

FIG. 21 is an embodiment wherein the add-on sensor housing 2100 contains an output device 2101 and an input device 2102. In some embodiments, output device 2101 includes a speaker, and input device 2102 includes a microphone. In some embodiments, device 2101 includes both output and input functionality, such as a selectively vibrating joystick controller that receives motion or pressure input from the user who pushes or tilts the joystick, and a sensory output such as a vibrator that is selectively turned on or off to provide a touch stimulator (touch feedback to the user as the joystick is moved or as some action takes place in a video game being executed) in the portable computing device. In some embodiments, output device 2101 includes a light flash and input device 2102 includes a light sensor. In some embodiments, an auxiliary input or output device 2103 is provided. In some such embodiments, output device 2101 can be interchanged with a different type of flash 2103. In other such embodiments, sensor 2102 can be interchanged with a separate, optimized sensor 2103. In one embodiment, 2102 is a moisture sensor. In another embodiment, 2102 detects airborne pathogens. In one embodiment, 2103 is a blood-test measuring device that measures various properties of blood cells and other blood components. In some embodiments, an integrated controller 2104 is included.

Figure 22A:
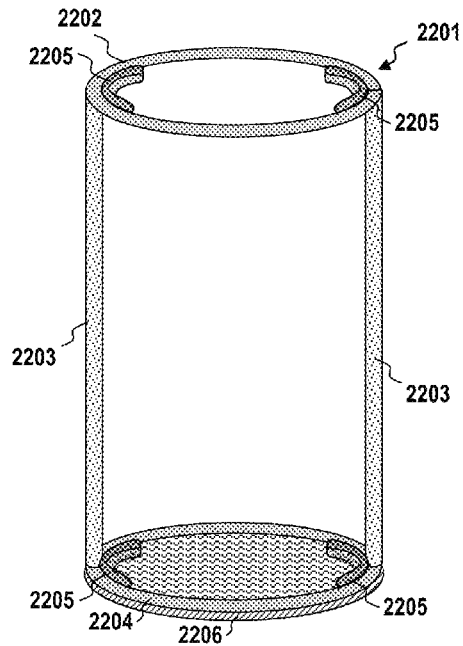
FIG. 22A is a perspective view of a external protection cage (a type of protective enclosure) 2201 having open faces on the top, bottom, front and back sides, that can attach around a mobile device 2290 that has a curved cross-section profile and includes a touch-sensitive curved outer surface 2291.

FIG. 22A is a perspective view of an external protective cage (a type of protective enclosure) 2201 having open faces on the top, bottom, front and back sides. In some embodiments, protective cage 2201 includes a first-end (e.g., top) frame member 2202 (in some embodiments, a rod-shaped member having an oval toroid shape) that holds a first plurality of resilient inner bumpers 2205 configured to grip and cushion one end of a mobile computing device 2290 (such as described in U.S. Patent Publication 20130076612 titled "ELECTRONIC DEVICE WITH WRAP AROUND DIS- PLAY" by Scott Myers, published Mar. 28, 2013, which is incorporated herein by reference; see FIG. 22B), a second-end (e.g., bottom) frame member 2202 that holds a second plurality of resilient inner bumpers 2205 configured to grip and cushion the opposite end of a mobile computing device 2290, a plurality of rod-shaped side frame members 2203 that are each affixed to and extend from first-end frame member 2202 to second-end frame member 2204, and an electronics housing 2206 (e.g., in some embodiments, attached across the bottom of second-end frame member 2204. In some embodiments, one or more of the rod-like frame members 2202, 2203 and/or 2204 include a touch-sensitive sensor surface configured to receive gesture commands (e.g., taps, wipes, presses, multi-touch contacts, and the like) from a human user. In some embodiments, one or more of the side rod-like frame members 2203 operate as "hyperrollers" that sense circumferential wiping motions of the users fingers in a circumferential direction around the longitudinal axis, as well as longitudinal wiping motions along the length of a member 2203. (In some embodiments, the circumferential wiping motions cause the objects displayed on the screen(s) of device 2290 to be scrolled in left-or-right directions, while longitudinal wiping motions cause the objects displayed on the screen(s) of device 2290 to be scrolled in up-or-down directions. In some embodiments, similar wiping motions are sensed on one or more of frame members 2202 and/or 2204, and are used as user input to control the operations of device 2290. In some embodiments, one or more of members 2203 are physically rotatable around its longitudinal axis, and such rotation is used as human-user input to control an operation (such as screen scrolling) of device 2290. In some other embodiments, one or more of members 2203 is touch sensitive in order to be virtually rotatable around its longitudinal axis (i.e., wiping motion is detected and interpreted as rolling of the sensor by the humans finger), and such rotation is used as human-user input to control an operation (such as screen scrolling) of device 2290.

Figure 22B:
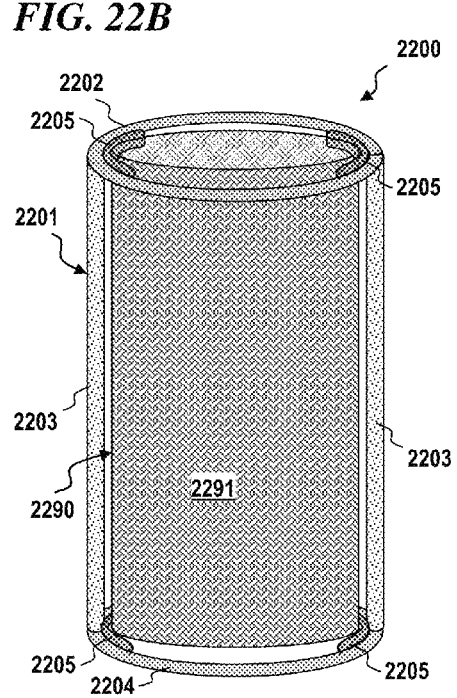
FIG. 22B is a perspective view of a system 2200 that includes external protection cage 2201 having open faces on the top, bottom, front and back sides, that can attach around a mobile device 2290 that has a curved cross-section profile and includes a touch-sensitive curved outer surface 2291.

FIG. 22B is an illustration of a mobile device system 2200 includes a mobile device 2290 (such as those described in that has a curved surface and contains a touch-sensitive surface 2291 on at least one side (in some embodiments, the device 2290 has touch-sensitive surface 2291 on both the front and back; in some embodiments, the device 2290 has a visual display on both the front and back). In one embodiment an external protection cage 2201 provides structural protection and case-like properties to offer protection from elements as well as from potentially damaging impact, for example, if the device is dropped by the human user. In one embodiment, part of the cage structure (e.g., at least one of the frame members 2202, 2203 and/or 2204) acts as a hyperroller.

Figure 23:
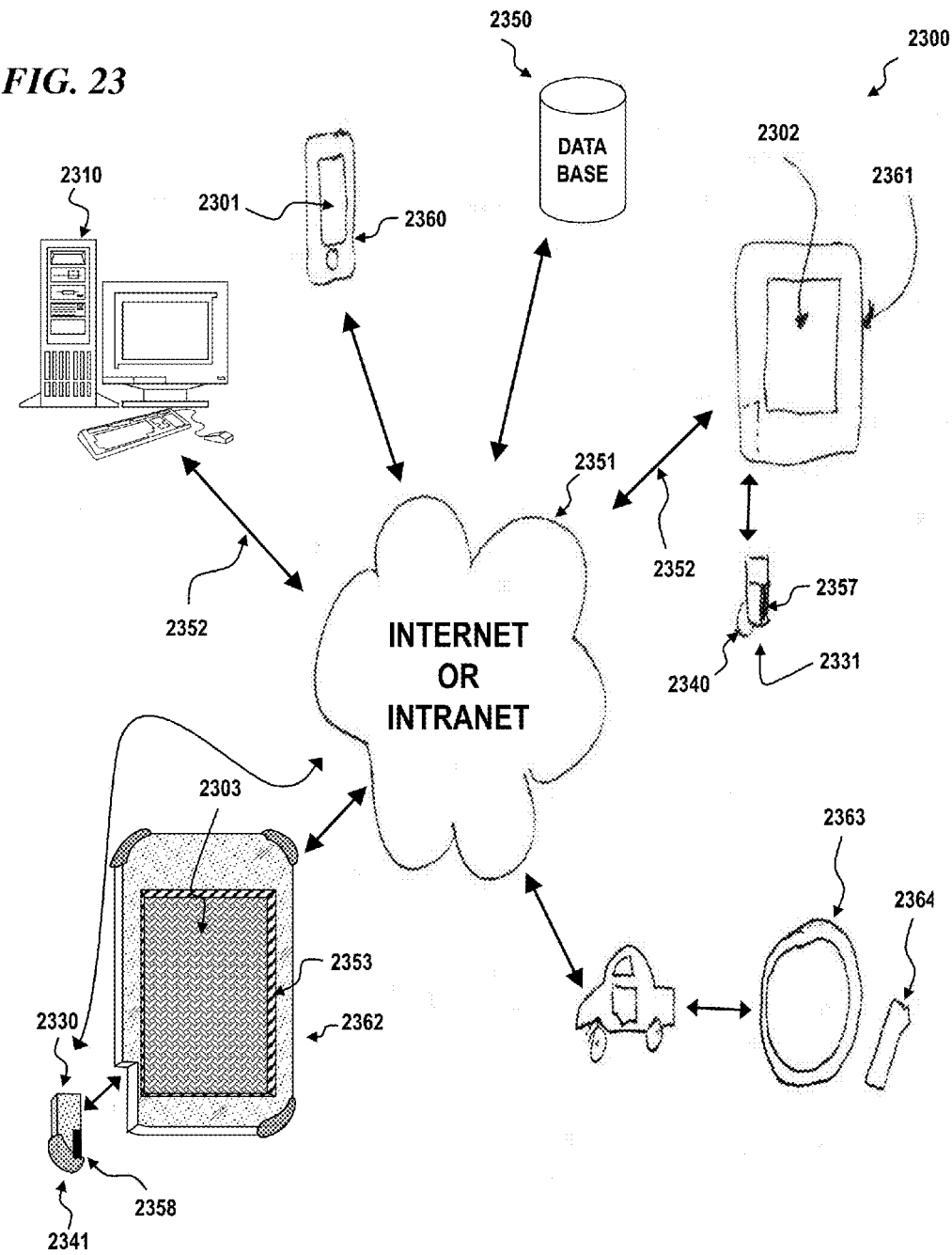
FIG. 23 is an illustration of the data flow 2300 from various mobile electronics 2301, 2302 and 2303.

FIG. 23 is an illustration of the data flow 2300 from various mobile electronics 2301, 2302 and 2303. The wired or wireless connectivity 2352 connects external sensory devices 2330 and 2331 to their respective protective enclosure devices 2360, 2361 and 2362. The system in some embodiments uses a database 2350, an internet or intranet 2351, and a desk-top server 2310. External clip-on sensors 2330 and 2331 contain various components to enable wireless connectivity 2341 with processors 2358 and batteries 2357 incorporated with external sensory devices 2340. External sensory devices can be enhanced with sensory-control components 2353, which in some embodiments is a hyperroller. In some embodiments, sensors are located on a steering wheel in a car 2363 and in the dashboard or arm-rest of a vehicle 2364. In another embodiment, the sensors are dynamically connected to other devices. In one embodiment, the sensors are user controlled wherein the user can determine the sensory-input-device parameters and can optimize and tune the resulting data input and the data output from the sensors.

Several embodiments of the invention are herein described to provide illustrations of implementing the invention and realizing the results of the unique characteristics of the invention. The invention is not limited to the embodiments illustratively described here.

In one embodiment, the sensors are programmed via a software application. In another embodiment, the optimizing of the data generated from the sensors helps authenticate a protocol or a user. In one embodiment the device and method authenticates an adult user separate from a child user.

In one embodiment the sensors (e.g., 2203 shown in FIG. 22, 1502 shown in FIGS. 15, and 1603 shown in FIG. 16) are programmed by a user to help interface with a software application. In one embodiment the sensors are programmed to have multivariate gesture controls to navigate the software on the mobile device.

In the present invention, mobile computing devices are understood to include, but not be limited to, mobile telephones, personal data assistants, devices such as iPads® and iPods®, music players, and the like.

In some embodiments the present invention provides a protective housing for a mobile device, designed for access to sensors embedded in the mobile device, which includes sensor input components on an external housing; wherein the back of a mobile device is accessible. In some such embodiments the protective housing has external sensory inputs on a protective housing located between the back of the housing, and the back surface of the mobile device. In some such embodiments the protective housing has user-programmable input sensors that are programmed by the user of the mobile device, or by a remote user using a separate device. In some such embodiments the user can provide the gesture control programming enabling the sensors to control the software application on the mobile device according to user preferences.

In some embodiments the present invention provides a protective housing for a mobile device, designed for access to external sensors embedded in a protective housing of a mobile device, including sensors that are connect to the housing, wherein the sensors are controlled by users who provide a plurality of human-user-defined sensory parameters and data. In some embodiments remote users can provide sensory data from remote locations to separate users utilizing separate mobile devices. In some embodiments user data and preferences are stored within the protective housing. In some embodiments user data is stored on remote servers.

In some embodiments the present invention provides a protective housing for a mobile device, where the protective housing contains ridged bars that contain the mobile device. In some such embodiments the bars are movable and interchangeable to fit various mobile-device sizes and shapes. In some embodiments the protective housing contains crashbump protective pieces. In some embodiments the crashbump protection is pressurized. In some embodiments the crashbumpers are programmable. In some embodiments the crashbumpers are programmed to deploy a protective method to protect the mobile device upon impact. In some embodiments the crashbumpers are located on the exterior of a mobile device without a protective housing.

In some embodiments, there are a number of parameters that are processed on board the sensory-interface device included in this invention and other embodiments wherein the processing is supported by the processor of the attached mobile electronic. Some parameters of the invention include: Gesture customization, basic sensor configuration, sensitivity controls, processing of data, noise filtering, detection of sensory information, processing how certain filters are applied and adjusted, features turned on or turned off, gestures in generic sense in taps in swipes, or high level description of what the hand is doing including an ability to adjust the filter parameters to include sensitivity and data quality measures.

In some embodiments, the customizable adjustment of intentional and unintentional gestures or touch, which also includes right handed grip versus left identified and controlled by the developer, right handed grip versus left identified and controlled automatically by the system, right handed grip versus left handed grip identified and controlled by the user, back channel adaptive controls, intuitive learning mode wherein the gestures from a remote device, for example a TV, can communicate volume and channel gestures as defined by the user.

Some embodiments of the present invention include a grip recognition code wherein the sensor can authenticate the user.

In other embodiments, wherein a first sensory-interface device can adaptively send data to one or more other sensory-interface devices.

In some embodiments, the sensory-interface device has internal memory embedded in the system which is separate from the connected mobile device. The securely encrypted data is stored within the sensory case, wherein the sync code is stored in the external data storage.

In some embodiments, the present invention includes a sensory case that includes other external sensory devices such as has external microphones. In some embodiments, automatic video-audio synchronization software is embedded in the data storage of the sensory-interface device and runs on a microprocessor also embedded in the sensory-interface device.

In another embodiment, a user with a first sensory-interface device can remotely connect to another user with a second sensory-interface device and can access the internal memory of the second sensory-interface device for authentication purposes.

In one embodiment, the authentication provides for encrypted payment processing of funds.

In another embodiment, the internal memory embedded in the sensory-interface device contains medical records that are accessible to emergency response personnel who can remotely access the data prior to an emergency event.

A unique and novel feature of this invention is the attribute of hardware and software combining to create an environment which a user can customize. A user contributes to the "uEffect" score and parameter weightings. By clicking on Game #1 the user can access the content of the blog, view the parameters within the system and can suggest a new parameter to evaluate Game.

Customization based on personal preferences is supported, including adapting controls, context dependent controls on both the sensory-interface device and the attached mobile device. In one embodiment the context is based the particular remote device a sensory-interface device is interacting with, for example a TV. The sensory-interface device enables multiple user authentication methods for various devices. A sensory-interface device can provide a sencode for a user's Apple computer at home based upon the sensory inputs from the sensory-interface device. When that same user goes to work, another sencode may be enabled which allows the user to log in to a network in the work environment.

In some embodiments, the sensory-interface device includes TV remote control functions that are enabled by the sensory inputs on the sensory-interface device. For example, volume controls for all devices can be programmed in to be a specific gesture, for example, for a left handed person, to be a thumb swipe up or down on the left side of the sensory-interface device. This gesture input can be configured to change the volume from the TV or other devices up or down.

It is clearly obvious that distractions to the visual and other sensory data, in one example sounds, are poorly tolerated by users. For example, in an auditorium with a very large screen and a room full of people, if what is displayed on the large screen is obstructed by people standing up in the front rows, the people in the back rows will have an obstructed view and will therefore not be limited in their interface with the presentation or the presenter. This situation is poorly tolerated. The inventor of this novel method and devices therefore takes a similar with an understanding that the traditional method of interfacing and providing data, and receiving data from mobile applications on a traditional screen is limited because often times fingers, thumbs or other input devices such as a digital pen. This invention provides for a method and devices that enable the users to interface with the content and other software applications as opposed to just interfacing with a mobile phone, tablet or other mobile electronic.

In some embodiments, the sensory-interface device is a protective case to mitigate the risk of damage to an attached mobile device should the device be dropped or be subject to other external forces. The invention provides for enhanced design characteristics to protect the mobile device and the components installed on the sensory-interface device.

In one embodiment, a touch sensitive protective case can be programmed to be an interactive TV remote: wherein the sensory-interface device case becomes a dynamic remote control. Another embodiment is a touch sensor housing, wherein the case can be customized to input Braille inputs based upon a user's preferences such as being right or left handed, or a Chinese keyboard wherein a finger or a thumb can activate a separate window that allows selection of various characters of Chinese language.

In some embodiments, a sensory-interface device includes a detachable, sensory device and serves as a protective housing for a mobile device that has one or more sensory components (one example being a capacitive touch (multitouch) sensor) embedded in it. The sensors are controlled by integrated circuits (ICs) in the housing, which are powered by a direct connection to the mobile device. Data created by the sensors is processed by the ICs and then transmitted to the mobile device. In some embodiments, the attached mobile device uses the processed multitouch sensor data to control the attached mobile device's Operating System and Application user interfaces. In other embodiments, the processing of the data created by the sensors is processed by processors located and embedded within the sensory-interface device itself.

In other embodiments, in addition to capacitive touch sensors, the protective housing may include additional and/or alternative sensor types including a force sensing resistive touch (pressure) sensor, gyroscope, magnetometer, barometer, accelerometer, thermometer, GPS, fingerprint scanner, RFID reader, or Near Field Communication (NFC) reader.

In some embodiments, communication of the sensor data to the attached mobile device is not limited to a wired connection and also includes a wireless connection such as Bluetooth® or WiFi.

In some embodiments, a sensory-interface device includes a battery to power the sensors instead of drawing power from the attached mobile device.

In some embodiments, a wireless communication option exists wherein instead of sending the processed sensor data to a specific mobile device, the data is instead broadcast (with no specific endpoint) and any mobile device can receive the data and use it.

In some embodiments, in addition to sending generic data (touches and gestures or basic sensor values), the processing of the raw sensor data takes into account the "context" of the attached mobile device. For instance, the attached mobile device indicates to the sensory-interface device that headphones are plugged in and that a panning gesture up and down on the multitouch sensors should send a "Volume Up/Down" command to the mobile device instead of just a generic "Panning Gesture" indication.

In some embodiments, a sensory-interface device is implemented a "sticker", where the touch-sensitive surface, ICs and a battery are built into a flexible membrane that has a non-permanent, non-destructive adhesive on one side such that the sensory-interface device can be attached to any mobile device.

In one embodiment, the sensory-interface device is programmed for contextual processing. In other embodiments, sensory-interface device includes ability for the code running on the sensory-interface device to deliver specific commands based upon a configurable context set by the attached mobile device. An example of a command is "Volume Up" or "Brightness Up" or "Call Mom". An example of a context is "In Car" or "Headphones On" or "Watching a Movie". In some embodiments, contexts are manually set through user interaction on the attached mobile device. In other embodiments, contexts are automatically set based upon sensor data (the sensors could be on the attached mobile device or sensory-interface device itself). Context identification also is programmed in some embodiments to automatically change as configured or programmed by the sensory-interface device itself. For example, a GPS unit included with a sensory-interface device identifies the sensory-interface device is "In the House" so enabling that context.

In some embodiments of the present invention grip recognition is employed. The housing of the sensory-interface device includes force sensing resistive sensors that extend to the sides of the sensory-interface device, and the edges or bevels, to enable grip recognition. The distance and pattern of pressure points from a hand gripping the sensory-interface device are biometric readings that are used to identify specific individuals. In other embodiments, sensor components built into the apparatus gather additional biometric readings including temperature, finger print patterns and color. In other embodiments, the additional sensors are attached to or embedded within the sensory-interface device, while in other embodiments external sensors are wireless connected to the sensory-interface device. Other sensory components include card readers to identify and gather digital content.

In some embodiments, when processing touch pressure data, a level of certainty is generated based upon the amount of variation between an established grip (whose parameters are stored within the sensory-interface device) and the detected grip.

In some embodiments, grip recognition is used to provide a context for the above "Contextual Processing", attached mobile device unlocking (based on biometric readings), or other adaptive user interface paradigms based on user identification.

In some embodiments, compressed air in conjunction with an inflatable airbag, or multiple airbags, is designed to be employed when risk of impact presents itself. In one example, a sensor embedded in the sensory-interface device detects a falling motion and potential impact beyond a safe threshold, and engages safety mechanisms (i.e., uses the compress air to inflate the air bag(s)).

In some embodiments, a sensory-interface device provides a method for users to interface with software applications and/or other users of other instance of sensory-interface devices in an interconnected environment wherein there is a link where data can be exchanged. In one example, the sensory-interface device contains touch sensitive inputs and other sensory components such as microphones, an internal controller and separate data storage independent of an attached mobile device.

In some embodiments, a first sensory-interface device, in conjunction with an attached mobile device with a camera, provides a method of combining multiple data inputs simultaneously from several remote devices. In some embodiments, a first sensory-interface device and attached mobile device act as a primary camera with other satellite sensory-interface devices and their attached mobile devices acting as other camera points. In some embodiments, the satellite sensory-interface devices and attached mobile devices share a single point of audio, wherein the audio is automatically synchronized with the video data. In one example, the application with the algorithm to synchronize the audio and video data resides in the data storage within the primary sensory-interface device that is connected to a mobile iPhone.

In another embodiment, a sensory-interface device provides location marking and orientation for remote data collection systems. For example a camera system attached to a gimble, or a gyro set up in a separate remote location such as a helicopter is sent data collected from a mobile device or data collected via a sensory-interface device's sensory components.

In some embodiments, satellite sensory-interface devices collect audio. Software, that runs on either an attached mobile device or internally on an embedded controller in the sensory-interface device, calculates the latency in the audio signal (due to distance), combines and synchronizes the audio data with the video data, stores the combined data, and transmits the combines audio/video data. In some embodiments, the transmitted data is made available to anyone with access to the system (wireless, Bluetooth®, near field communications or internet). In other embodiments, only users who have a sensory-interface device have access to the data. In other embodiments, access to the combined audio/video data is based upon pre-determined digital access rules.

In some embodiments, the external sensors on the sensory-interface device detect the presence and identity of one specific individual. One example of biometric identification is using a finger print obtained from a touch sensitive capacitive surface, and data that is stored in a sensory-interface device and processed by an embedded microcontroller in the sensory-interface device to identify and authenticate a user. In this example, the authentication can enable additional transactions such as a mobile payment.

In another example, a user, or a user group can customize a sencode, which is a combination of sensory data points that provides for authentication for one user, or a senscode for more than one user. Sencodes and senscodes may incorporate traditional character input (numbers and/or letters) with one or more sensory inputs. Another example of a sencode is an audio sound that is converted to data. Another example is a set of touch sensory inputs configured to establish an individual grip on a mobile device. In one example, a software application specific to creating and interpreting sencodes and senscodes is configured to determine if a user is right or left handed.

An advantage of the present invention is the ability to determine right and left handed users, and to provide specific content and/or user interfaces that are optimized to either a right handed user or a left handed user. In one example, the determination is automatic when configuring the attached mobile device. In another example, the right or left hand determination is configured within the sensory-interface device.

In some embodiments, a sensory-interface device, connected to an attached mobile device, includes a laser. In one example of use, the laser is used detect distances to objects or surfaces, or to obtain other data. This data can then be shared with other users. One example is includes a number of interconnected sensory-interface device users, wherein data from a primary sensory-interface device can be processed in its onboard microcontroller, sometimes in conjunction with stored data, and then is transmitted via the attached mobile device to other (satellite) sensory-interface device/mobile device combinations, processed by the satellite sensory-interface devices and made available for display or for other output for satellite sensory-interface device users.

In another example, a measuring wheel is attached to the sensory-interface device and the measurements collected can be converted to data and sent via the sensory-interface device to the attached mobile device, sent to storage either on board the sensory-interface device or to another location, and can be communicated to other devices based upon the digital rights management and authentications provided for by the sensory-interface device.

In some embodiments, for use in underwater or extreme air pressure environments, sensors embedded in the sensory-interface device obtain pressure measurements of the local environment pressure. Customizable software interfaces communicate certain triggers, alarms or other data to the user and other users.

In some embodiments, personal data is stored in the sensory-interface device. For example, individuals who are diabetic or have an unusual allergy or blood type often wear bracelets or other identification tags on their person. In this example, certain personal data including a medical record can be stored in and accessed via the sensory-interface device by emergency responding personnel based upon previously defined conditions. In some cases, sensory inputs from the sensory-interface device will authenticate an individual before releasing the data. In another example, the data is encrypted for security purposes and the encryption key for a sencode or senscode is stored on the Sensus apparatus.

In some embodiments data collected from a sensory-interface device is shared via a peer to peer sharing network. In one example, the senscode to unlock data can be sent to additional devices or provided for download, wherein a satellite sensory-interface device can store the senscode either within an attached mobile device or within the embedded data storage of the sensory-interface device. Because of the sensors embedded within the sensory-interface device, authentication information and other sensory data and information collected from the remote satellite sensory-interface devices can be transmitted back to a primary sensory-interface device.

In an embodiment specific to gaming, the sensory-interface device significantly improves the user interface for the content game and interaction with other users. In one example, the sensory-interface device enables multiple players can simultaneously access the game from the traditional touchscreen on an attached mobile device, while (via sensory-interface device enabling software code) other players access the game from the touch-sensitive surface on the back of the sensory-interface device. The sensory-interface device enables separate players to control separate functions within the game or other software application.

In some embodiments, a sensory-interface device includes a plurality of sensory output components that control the heat, vibration, color, and/or tactile feel of the sensory-interface device. Such components are custom configured to provide output based on user input of sensor data and/or output of application programs.

In some embodiments, a sensory-interface device sends raw data to another device such as a mobile device. In other embodiments, data is processed within the sensory-interface device. In some embodiments, data is sent as commands. In other embodiments, data is encrypted based upon a senscode or sencode.

In other embodiments, a sensory-interface device can be configured to have separate public keys for data access or output, and private keys for data access or output.

In some embodiments, a sensory-interface device and its attached mobile device are utilized as a remote control for a 3rd device. In some embodiments, a sensory-interface device can adaptively send data to one or more sensory-interface devices. In other embodiments, a sensory-interface device includes a computer system, an external sensory case that contains sensory inputs for a mobile device, and wherein the sensory-interface device includes a microprocessor and attaches (wirelessly, or via direct connection) to a mobile device.

In some embodiments, a sensory-interface device includes one or more touch-sensitive surface that can detect finger gestures. A microprocessor embedded in the sensory-interface device can be configured (or manipulated) by a user or a developer to customize code that is manipulated in the microprocessor and/or the software application that is running on the attached mobile device. In some embodiments, the sensory-interface device includes an embedded power supply or battery, independent of the attached mobile device's power source. In some embodiments, a sensory-interface device includes external data storage capacity configured to provide authentication where the data can be secured. In some embodiments, the data includes medical and financial data. In some embodiments, digital rights management is used to secure digital storage containing architect/movie producer/photographer data. In some embodiments, information available for emergency responders is biometrically secured. In some embodiments, a sensory-interface device can authenticate a user via chorded input (multiple finger input), grip and/or gesture recognition.

In some embodiments, a sensory-interface device includes transmitting data via RFID such that the sensory-interface device services as a secure ID device to perform functions such as unlocking a cabinet or an encrypted data file. In some embodiments, the touch-sensitive surface(s) are reconfigurable and dynamically mapped to virtual buttons, which facilitates multiplayer gaming wherein the cursors from a first sensory-interface device with attached mobile device reflect what is going on in another person's second sensory-interface device with attached mobile device. In some embodiments, the connection between a first sensory-interface device with attached mobile device and a second sensory-interface device with attached mobile device is Bluetooth®. In some embodiments, a sensory-interface device allows multiple game players to hold the device and simultaneously provide input via the touch-sensitive surface in order to collectively interact with a game and each other. In some embodiments, a sensory-interface device includes a control device such as a wheel for gambling gaming. In some embodiments, applications send data over a network for gaming, authentication or other collaborative purposes between a first sensory-interface device with attached mobile device and a second sensory-interface device with attached mobile device.

In other embodiments, the present invention includes a novel method to send data to other external devices.

In some embodiments, a sensory-interface device includes light sensitive sensors programmed to gather light data including, ISO number, intensity, color values and color temperatures (in degrees Kelvin). The sensory-interface device essentially combines a light meter, a color meter and a flash meter that interfaces with the attached mobile device, and external devices such as light flash units, and communicates with other like apparatuses. In other embodiments, a sensory-interface device enables an external device that triggers a flash device, enables a user interface on the attached mobile device screen, such that gesture sensor controls located on the sensory-interface device in conjunction with a touch sensitive screen on either the attached mobile device or on the back of the invention apparatus, recognize certain location input from a camera with the view displayed on the mobile device screen, wherein a light sensor reading can be measured by the sensory-interface device. The sensory-interface device can then communicate that reading to other external devices and trigger a flash or other function from the external devices.

In some embodiments, the present invention includes a method that includes providing a protective case having touch sensors, attaching the touch-sensor case to a user's mobile device, sensing touch of a user on the case; and wirelessly receiving data into the case. In some embodiments, the present invention further includes sensing a grip of the user; determining from the sensed grip whether the user is holding the device with a left hand versus a right hand; generating a first authentication code that is personal to the user based on the determination; combining the first authentication code with a device authentication code to generate a combined personal-and-device authentication code that enables a software function of the mobile device. In some embodiments, the present invention further includes gathering data from a plurality of sources for compilation into at least one touch-sensitive device; such that the data can be sent to remote satellite devices; wherein the data is searchable from a database that is internal to the touch-sensitive device that is accessible through a communications network.

In some embodiments, the present invention further includes sensing biometric data of the user. In other embodiments, the present invention further includes sensor components that are located on the back, sides and bevel edges of a protective, clip-on enclosure of a mobile electronic device. In other embodiments, the present invention further includes processing, sending data generated from the input sensory components to other electronic devices via a wireless communication network. In other embodiments, the present invention further includes receiving data generated from the input sensory components of other electronic devices via a wireless communication network. In some embodiments, the present invention further includes sending and receiving data generated from the input sensory components to a database embedded in the sensory clip on device. In other embodiments, the present invention further includes sending and receiving data generated from the input sensory components to a database located on a network separate from the sensory clip on device. In other embodiments, the present invention further includes determining from the sensed grip whether the user is holding the device with a left hand. In other embodiments, the present invention further includes combining a first authentication code with a device authentication code to generate a combined personal-and-device authentication code that enables a software function of the mobile device. In other embodiments, the present invention further includes sensing some other parameter (light, gravity direction) or touch. In other embodiments, the present invention further includes providing feedback to the user by vibrating the case and/or activating an illumination source in the case. In other embodiments, the present invention further includes activating applications on other electronic devices (such as a TV), and receiving data parameters from other electronic devices; wherein the parameters can be interpreted and changed from touch-sensitive surfaces on the device. In some embodiments, the present invention further includes providing a cost parameter indicating price of some content and a content-type parameter; and combining the cost parameter with the first authentication code to form an authenticated purchase code and transmitting the authenticated purchase code to a remote server.

In some embodiments, the present invention further includes eliciting and receiving parameters indicative of sensory gestures of the user that indicate preferences improving user interface of software applications. In other embodiments, the present invention further includes eliciting and receiving parameters indicative of sensory gestures of the user that indicate preferences improving user interface of software applications that also incorporate a time function. In other embodiments, the present invention further includes eliciting and receiving parameters indicative of sensory inputs of the user to authenticate a user; and wherein a time function is included in the authentication. In some embodiments of the present invention the parameters collected by the sensory inputs, and the authentication information is used in a plurality ways. Depending on the particular embodiment, this data may be stored on the sensory apparatus; stored on a remote server; communicated to a satellite sensory apparatus; used to authenticate a transaction, and/or used to authenticate a user.

In some embodiments, the present invention includes a computer-readable medium having instructions stored thereon, wherein the instructions when executed by a suitable information processor, perform a method which includes receiving a signal that includes parameters from a grip of the user on a protective case having a touch sensor, wherein the touch-sensor case is attached to a user's mobile device; determining from the sensed grip whether the user is holding the device with a left hand versus a right hand; and generating a first authentication code that is personal to the user based on the determination. In some embodiments, the present invention further includes the ability to identify if specific features are turned on or off. In some embodiments, the present invention further includes the ability to adjust the filter parameters to include sensitivity and data-quality measures. In some embodiments, the present invention further includes enabling the customizable adjustment of filters. In some embodiments, the present invention further includes enabling filter adjustment of intentional and unintentional gestures or touch and other data considered noise. In some embodiments, the present invention further includes the ability for the apparatus to provide training of system applications, user adaption improving the user interface. In some embodiments, the computer-readable medium of claim 2, having further instructions stored thereon, wherein the further instructions when executed by a suitable information processor, cause the method to further include combining the first authentication code with a device authentication code to generate a combined personal-and-device authentication code that enables a software function of the mobile device. In some embodiments, the present invention further includes allowing for back channel adaptive control. In other embodiments, the present invention further includes enabling intuitive learning modes wherein the gestures from an electronic device, such as a TV, can communicate volume and channel gestures as defined by the user. In some embodiments, the present invention further includes enabling a separate operating environment independent to the attached mobile device. In some embodiments, the present invention further includes enabling a separate operating environment independent to the attached mobile device; allowing for customizable features and applications.

In some embodiments, the present invention includes a sensory-interface device which includes a protective case that has touch capacitive sensors, wherein the touch-sensor case is configured to be attached to a user's mobile device; sensors in the case configured to sense a grip of the user; a handedness detector operably connected to the sensor and configured to determine from the sensed grip whether the user holds the device with a left hand versus a right hand; and a user-authentication generator operably coupled to the handedness detector and configured to generate a first authentication code that is personal to the user based on the determination. In some embodiments, the present invention further includes a combiner that combines the first authentication code with a device-authentication code to generate a combined personal-and-device-authentication code that enables a software function of the mobile device. In other embodiments, the present invention further includes an audio component sensing audio input data and enabling audio output from data received from another electronic device; and combining sensory audio information in to authentication code. In some embodiments, the present invention further includes a light sensitive component sensing light input data and enabling light and color output from data received from another electronic device; and combining sensory light information in to authentication code. In other embodiments, the present invention further includes a pressure component sensing gravity and environmental pressure data and enabling the data to be sent to a data base or another electronic device; and combining pressure sensing information in to authentication code.

In some embodiments, the present invention includes a sensory-interface device which includes a protective case that has touch capacitive sensors, wherein the touch-sensor case is configured to be attached to a user's mobile device. In some embodiments, the present invention includes a sensory-interface device which includes enabling a gesture, touch based switch wherein the code reverses of the 'front' touch display of the mobile device to the back touch panel of the sensor device. In some embodiments, the present invention includes a sensory-interface device which includes code that stores information on the firmware of the sensor-case at the root level. In some embodiments, the present invention includes a sensory-interface device which includes code that is agnostic in user interface that can broadcast and share with other remote electronic devices. In some embodiments, the present invention includes a sensory-interface device which includes code that enables the use of other additional sensory devices. In some embodiments, the present invention includes a sensory-interface device which includes code that enables the use of other additional sensory devices including a laser. In some embodiments, the present invention includes a sensory-interface device which includes code that enables the use of other additional sensory devices including an audio device. In some embodiments, the present invention includes a sensory-interface device which includes code that enables the use of other additional sensory devices including a wheel measure device. In some embodiments, the present invention includes a sensory-interface device which includes a light meter that can wireless trigger external flash devices, or other external apparatus.

In some embodiments, the present invention provides a method for implementing and using a sensory-interface device. The method includes: providing a protective case having plurality of touch-sensitive sensors; attaching the touch-sensor case to a user's mobile device; providing a communications mechanism configured exchange data between the protective case and a user's mobile phone; sensing touch of a user on the case; sensing a gesture made by the user on one of the touch sensitive surfaces; generating a first authentication code that is personal to the user based on the sensed gesture; combining the first authentication code with a device authentication code to generate a combined personal-and-device authentication code that enables a software function of the mobile device; and gathering data from a plurality of sources for compilation into at least one touch-sensitive device; wherein the data can be sent to remote satellite devices; wherein the data is searchable from a database that is internal to the touch-sensitive device that is accessible through a communications network.

In some embodiments of the method, the touch sensitive sensors are located on the back and sides of the protective case.

In some embodiments of the method, the touch sensitive sensors sense touch location and pressure, and wherein the touch sensors sense multiple simultaneous touches.

In some embodiments of the method, the touch-sensitive sensors measure the touch location and touch pressure variation over time.

In some embodiments of the method, the sensed gesture is a grip, and determining from the sensed grip whether the user is holding the device with a left hand versus a right hand.

In some embodiments of the method, the protective case includes a back, a plurality of sides and a plurality of beveled edges, and wherein the plurality of touch-sensitive sensors are located on the back, sides and bevel edges of the protective case.

In some embodiments of the method, the protective case further includes secure data storage, a data encryption and decryption facility and encrypted data stored in the secure data storage; and the combined personal-and-device authentication code is required to access information the encrypted data in the secure data storage.

In some embodiments of the method, the protective case further includes a laser and a light sensing device.

In some embodiments of the method, the surface of the touch-sensitive sensors is textured to provide tactile feedback to the user.

In some embodiments of the method, the communication mechanism between the protective case and the mobile phone is wireless.

In some embodiments of the method, the communication mechanism between the protective case and the mobile phone is wired.

In some embodiments, the present invention provides a computer-readable medium having instructions stored thereon, wherein the instructions when executed by a suitable information processor, perform a method that includes: receiving a signal that includes parameters from a gesture made by a user on a protective case having a touch sensor, wherein the touch-sensor case is attached to a user's mobile device; generating a first authentication code that is personal to the user based on the gesture; combining the first authentication code with a device authentication code to generate a combined personal-and-device authentication code that enables a software function of the mobile device; and gathering data from a plurality of sources for compilation into at least one touch-sensitive device; wherein the data can be sent to remote satellite devices; wherein the data is searchable from a database that is internal to the touch-sensitive device that is accessible through a communications network.

In some embodiments of the medium, the protective case further includes secure data storage, a data encryption and decryption facility and encrypted data stored in the secure data storage; and the medium further includes instructions such that the method further includes: eliciting and receiving data from the user; encrypting the data and storing the data in the secure data storage; eliciting and receiving from the user a gesture that generates the first authentication code that is required to access the encrypted data in the secure data storage; and decrypting the data.

In some embodiments, the present invention provides an apparatus that includes: a protective case that has touch capacitive sensors, wherein the touch-sensor case is configured to be attached to a user's mobile device; sensors in the case configured to sense a gesture made by the user; gesture detector operably connected to the sensor; and a user-authentication generator operably coupled to the gesture detector and configured to generate a first authentication code that is personal to the user based on the gesture.

In some embodiments of the apparatus, the touch sensitive sensors are located on the back and sides of the protective case. In some embodiments of the apparatus, the touch sensitive sensors sense touch location and pressure variation over time, and wherein the touch sensors sense multiple simultaneous touches. In some embodiments of the apparatus, the protective case further includes secure data storage, a data encryption and decryption facility and encrypted data stored in the secure data storage; and the authentication code is required to access information the encrypted data in the secure data storage. In some embodiments of the apparatus, the gesture detector detects if the gesture is a grip, and determines from the sensed grip whether the user is holding the device with a left hand versus a right hand.

In some embodiments of the apparatus, the protective case includes a back, a plurality of sides and a plurality of beveled edges, and wherein the plurality of touch-sensitive sensors are located on the back, sides and bevel edges of the protective case. In some embodiments of the apparatus, the protective case includes a laser and a light sensing device.

In some embodiments, the present invention includes a sensory-interface device which includes code that enables the use of other additional sensory devices; wherein certain code processes data on the apparatus; wherein the apparatus is external device separate from a wireless mobile device; wherein the apparatus has sensory inputs that enable user interface, and wherein the apparatus can wirelessly transmit data or code to enable separate functions on external, separate devices. In some embodiments, the present invention includes a sensory-interface device which includes code that enables gathering more than one sensory data input, and combining the multivariate data inputs in to a summary symbol or score. In some embodiments, the present invention further includes gesture based recognition of hand grip and finger and thumb navigation of the software application; wherein the software application functions within the mobile device. In some embodiments, the present invention further includes gesture based recognition of hand grip and finger and thumb navigation of the software application; wherein the software application functions within the external sensory apparatus. In some embodiments, the present invention further includes light sensor components that gather data; enabling a wireless trigger for an external device wherein the external device is one or more flash devices, enables an interface with the mobile device screen, the gesture sensor controls located on the apparatus, certain gestures are programmed to recognize location in put on the screen, wherein the light sensors than measure the light readings specific to the location input from the mobile device screen.

It is to be understood that the above description is intended to be illustrative, and not restrictive. Although numerous characteristics and advantages of various embodiments as described herein have been set forth in the foregoing description, together with details of the structure and function of various embodiments, many other embodiments and changes to details will be apparent to those of skill in the art upon reviewing the above description. The scope of the invention should be, therefore, determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

What is claimed is:

1. A method for implementing and using a first sensory-interface device, the method comprising:
providing a protective touch-sensor case having plurality of touch-sensitive surfaces that each have a plurality of touch-sensitive sensors;
attaching the protective touch-sensor case to a first user's mobile device to form the first sensory-interface device, wherein the mobile device has a display visible on a front face of the first sensory-interface device, wherein the plurality of the touch-sensitive surfaces includes a first touch-sensitive surface on a back face of the first sensory-interface device, and wherein the first sensory-interface device is one of a plurality of sensory-interface devices each having a respective user;
exchanging data between the protective touch-sensor case and the first user's mobile device;
sensing touch of the first user on the protective touch-sensor case;
training the first sensory-interface device to recognize a first gesture of the first user by having the first user trace the first gesture a plurality of times on the back face of the first sensory-interface device and developing a first set of reference information from a parameterized model of the first gesture;
sensing and capturing a gesture made by the first user on the first touch-sensitive surface on the back face of the first sensory-interface device;
comparing the captured gesture to the first set of reference information and, if the comparison is sufficiently matching, then generating a first personal authentication code that is personal to the first user based on the captured gesture;
gathering data input from each respective user into each one of the plurality of sensory-interface devices for compilation into at least one of the plurality of sensory-interface devices;
wirelessly sending the gathered data input among the plurality of sensory-interface devices based on personal authentication codes of the respective users of the plurality of sensory-interface devices;
storing the gathered data input in a searchable database that is internal to the first sensory-interface device; and accessing and searching the database that is internal to the first sensory-interface device through a communications network.

2. The method of claim 1, wherein the first sensory-interface device includes a second plurality of touch-sensitive sensors located on the sides of the protective touch-sensor case.

3. The method of claim 1, wherein the method further includes using the touch sensitive sensors to sense touch location and pressure, and wherein the touch sensors sense multiple simultaneous touches.

4. The method of claim 1, wherein the method further includes using the touch-sensitive sensors to measure the touch location and touch pressure variation over time.

5. The method of claim 1 wherein the captured gesture is a grip, wherein the sensing of the gesture includes sensing the user's palm touching the back face of the first sensory-interface device and sensing some of the user's fingers touching sides of the first sensory-interface device, and wherein the method further includes determining from the sensed grip whether the first user is holding the device with the first user's left hand versus the first user's right hand.

6. The method of claim 1, wherein the protective case includes a back, a plurality of sides and a plurality of beveled edges, and wherein the plurality of touch-sensitive sensors are located on the back, on the sides and on the beveled edges of the protective case.

7. The method of claim 1,
wherein the protective case further includes secure data storage, a data encryption and decryption facility and encrypted data stored in the secure data storage,
wherein the combined personal-and-device authentication code is required to access information the encrypted data in the secure data storage, and
wherein the method further comprises:
eliciting and receiving data from the first user;
encrypting the data and storing the encrypted data in the secure data storage;
eliciting and receiving from the first user the gesture that generates the first authentication code; and
decrypting the data based on the first personal authentication code.

8. The method of claim 1, wherein the protective case further includes a laser and a light sensing device.

9. The method of claim 1, wherein the surface of the touch-sensitive sensors is textured to provide tactile feedback to the user.

10. The method of claim 1 wherein the communication mechanism between the protective case and the mobile phone is wireless.

11. The method of claim 1 wherein the communication mechanism between the protective case and the mobile phone is wired.

12. The method of claim 1, further comprising:
combining the first personal authentication code with a device authentication code to generate a combined personal-and-device authentication code that enables a software function of the mobile device.

13. The method of claim 1, further comprising:
training the first sensory-interface device to recognize a second gesture of the first user by having the first user trace the second gesture a plurality of times on the back face of the first sensory-interface device, and developing a second set of reference information from a parameterized model of the first gesture;
sensing and capturing a further gesture made by the first user on the first touch-sensitive surface on the back face of the first sensory-interface device and comparing the captured further gesture to the second set of reference information and, if the comparison is sufficiently matching, then generating a second personal authentication code that is personal to the first user based on the second gesture;
eliciting and receiving data from the first user;
encrypting the data using the second personal authentication code and storing the encrypted data in the secure data storage;
eliciting and receiving from the first user the second gesture and generating the second authentication code based on the second gesture; and
decrypting the data based on the second personal authentication code.

14. A non-transitory computer-readable medium having instructions stored thereon, wherein the instructions when executed by a suitable information processor, perform a method comprising:
exchanging data between a protective touch-sensor case and a first user's mobile device, wherein the protective touch-sensor case includes a plurality of touch-sensitive surfaces that each have a plurality of touch-sensitive sensors, and wherein the protective touch-sensor case is attached to the first user's mobile device to form a first sensory-interface device, wherein the mobile device has a display visible on a front face of the first sensory-interface device, wherein the plurality of the touch-sensitive surfaces includes a first touch-sensitive surface on a back face of the first sensory-interface device, and wherein the first sensory-interface device is one of a plurality of sensory-interface devices each having a respective user;
sensing touch of the first user on the protective touch-sensor case;
training the first sensory-interface device to recognize a first gesture of the first user by having the first user trace the first gesture a plurality of times on the back face of the first sensory-interface device, and developing a first set of reference information from a parameterized model of the first gesture;
sensing and capturing a gesture made by the first user on the first touch-sensitive surface on the back face of the first sensory-interface device;
comparing the captured gesture to the first set of reference information and, if the comparison is sufficiently matching, then generating a first personal authentication code that is personal to the first user based on the captured gesture;
gathering data from each one of the plurality of sensory-interface devices for compilation into at least one of the plurality of sensory-interface devices;
wirelessly sending the data among the plurality of sensory-interface devices based on personal authentication codes of the respective users of the plurality of sensory-interface devices;
storing the data in a searchable database that is internal to the first sensory-interface device; and
accessing and searching the database that is internal to the sensory-interface device through a communications network.

15. The medium of claim 14,
wherein the protective case further includes secure data storage, a data encryption and decryption facility and encrypted data stored in the secure data storage, and
wherein the medium further includes instructions such that the method further comprises:

combining the first personal authentication code with a device authentication code to generate a combined personal-and-device authentication code that enables a software function of the mobile device, wherein the combined personal-and-device authentication code is required to access information the encrypted data in the secure data storage;

eliciting and receiving data from the first user;

encrypting the data and storing the encrypted data in the secure data storage;

eliciting and receiving from the first user the gesture that generates the first authentication code that is combined with the device authentication code to generate the combined personal-and-device authentication code required to access the encrypted data in the secure data storage; and decrypting the data based on the combined personal-and-device authentication code.

16. The medium of claim 14, wherein the medium further includes instructions such that the method further comprises:

combining the first personal authentication code with a device authentication code to generate a combined personal-and-device authentication code that enables a software function of the mobile device.

17. An apparatus comprising:

a protective touch-sensor case that has a first plurality of touch-sensitive sensors, wherein the touch-sensor case is configured to be attached to a first user's mobile device to form a first sensory-interface device that has a front face that shows a display of the user's mobile device and a back face that includes the first plurality of touch-sensitive sensors, wherein the first sensory-interface device is one of a plurality of sensory-interface devices each having a respective user;

a gesture-modeling unit in the touch-sensor case that is configured to elicit and receive a plurality of traces of a first gesture by the first user on the back face of the first sensory-interface device and to develop a first set of reference information from a parameterized model of the first gesture;

wherein the first plurality of touch-sensitive sensors in the case are configured to later sense a gesture made by the first user on the back face of the first sensory-interface device;

a gesture detector operably connected to the first plurality of touch-sensitive sensors and configured to capture the sensed gesture;

a user-authentication generator operably coupled to the gesture detector and configured to compare the captured gesture to the first set of reference information and, if the captured gesture and the first set of reference information sufficiently match, then to generate a first personal authentication code that is personal to the first user based on the gesture;

a data input gatherer in each one of the plurality of sensory-interface devices configured to gather date input from each respective user of the plurality of sensory-interface devices for compilation into at least one of the plurality of sensory-interface devices;

a wireless transceiver configured to send the data between the plurality of sensory-interface devices based on personal authentication codes of the respective users of the plurality of sensory-interface devices;

a database that is internal to the sensory-interface device that is configured to store the data in the database based on personal authentication codes of the respective users of the plurality of sensory-interface devices; and a database searcher unit that searches the database that is internal to the first sensory-interface device and provides access to the database through a communications network.

18. The apparatus of claim 17, wherein the first sensory-interface device includes a second plurality of touch-sensitive sensors located on the sides of the protective touch-sensor case.

19. The apparatus of claim 17, wherein the first plurality of touch- sensitive sensors sense touch location and pressure variation over time, and wherein the first plurality of touch-sensitive sensors sense multiple simultaneous touches.

20. The apparatus of claim 17, wherein the protective touch-sensor case further includes secure data storage, a data encryption and decryption facility and encrypted data stored in the secure data storage; and wherein the first personal authentication code is required to access information the encrypted data in the secure data storage.

21. The apparatus of claim 17, wherein the first sensory-interface device senses the user's palm on the back face of the first sensory-interface device and the user's fingers on sides of the first sensory-interface device, and wherein the gesture detector detects if the gesture is a grip by the sensed user's palm on the back face of the first sensory-interface device and the sensed user's fingers on sides of the first sensory-interface device and determines from the sensed grip whether the user is holding the device with a left hand versus a right hand.

22. The apparatus of claim 17, wherein the protective touch-sensor case includes a back that forms the back face of the first sensory-interface device, a plurality of sides and a plurality of beveled edges, and wherein the plurality of touch-sensitive sensors are located on the back, sides and bevel edges of the protective touch-sensor case.

23. The apparatus of claim 17, wherein the protective touch-sensor case further includes a laser and a light sensing device.

24. An apparatus comprising:

a sensory-shell protective housing for mobile computing device, the housing comprising:

a plurality of external sensory inputs on the housing;

a gesture-modeling unit in the touch-sensor case that is configured to elicit and receive a plurality of traces of a first gesture by the first user on the back face of the first sensory-interface device and to develop a first set of reference information from a parameterized model of the first gesture;

a gesture detector operably connected to the plurality of external sensory inputs and configured to capture a gesture;

a user-authentication generator operably coupled to the gesture detector and configured to compare the captured gesture to the first set of reference information and, if the captured gesture and the first set of reference information sufficiently match, then to generate a first personal authentication code that is personal to the first user based on the gesture; and a compartment in the housing adapted to receive a plug-in functional subsystem, the compartment including a plurality of electrical contacts adapted to pass signals between the housing and the plug-in functional subsystem.

25. The apparatus of claim 24, further comprising the functional plug-in subsystem positioned in the compartment and electrically connected to the plurality of electrical contacts, wherein the functional plug-in subsystem includes an additional plurality of external sensory inputs.

* * * * *